(12) United States Patent
Panarello et al.

(10) Patent No.: US 8,890,025 B2
(45) Date of Patent: Nov. 18, 2014

(54) METHOD AND APPARATUS TO SCRIBE THIN FILM LAYERS OF CADMIUM TELLURIDE SOLAR CELLS

(75) Inventors: Tullio Panarello, St-Lazare (CA); Mathew Rekow, Santa Cruz, CA (US); Richard Murison, St-Lazare (CA)

(73) Assignee: ESI-Pyrophotonics Lasers Inc., Quebec (CA)

( * ) Notice: Subject to any disclaimer, the term of this patent is extended or adjusted under 35 U.S.C. 154(b) by 634 days.

(21) Appl. No.: 13/078,787

(22) Filed: Apr. 1, 2011

(65) Prior Publication Data

US 2011/0240614 A1    Oct. 6, 2011

Related U.S. Application Data

(63) Continuation-in-part of application No. 12/889,435, filed on Sep. 24, 2010, now Pat. No. 8,847,112.

(60) Provisional application No. 61/245,582, filed on Sep. 24, 2009.

(51) Int. Cl.
  *B23K 26/36* (2014.01)
  *B23K 26/40* (2014.01)
  *B23K 26/06* (2014.01)
  *B23K 26/0622* (2014.01)

(52) U.S. Cl.
  CPC .......... *B23K 26/0635* (2013.01); *B23K 26/365* (2013.01); *B23K 26/367* (2013.01); *B23K 26/409* (2013.01)
  USPC .................................................. 219/121.69

(58) Field of Classification Search
  USPC ............. 219/121.69, 121.72, 121.61, 121.62; 438/463, 940
  See application file for complete search history.

(56) References Cited

U.S. PATENT DOCUMENTS

| | | | |
|---|---|---|---|
| 3,626,141 A | | 12/1971 | Daly |
| 4,371,740 A | * | 2/1983 | Clem .......................... 136/256 |
| 5,400,350 A | | 3/1995 | Galvanauskas |

(Continued)

FOREIGN PATENT DOCUMENTS

| | | | | |
|---|---|---|---|---|
| JP | 5-206548 A | * | 8/1993 | |
| JP | 8-10970 A | * | 1/1996 | |

(Continued)

OTHER PUBLICATIONS

Machine translation of Japan Patent No. 8-10,970, Sep. 2013.*

(Continued)

*Primary Examiner* — Geoffrey S Evans
(74) *Attorney, Agent, or Firm* — Haynes Beffel & Wolfeld LLP

(57) ABSTRACT

A method of laser scribing a CdTe solar cell structure includes providing a laser operable to produce an optical pulse. The optical pulse is characterized by a temporal profile having a first power level during a first portion of the optical pulse and a second power level less than the first power level during a second portion of the optical pulse. The method also includes directing the optical pulse to impinge on the CdTe solar cell structure. The CdTe solar cell structure includes a substrate, a transmission spectrum control layer adjacent the substrate; a barrier layer adjacent the transmission spectrum control layer, and a conductive layer adjacent the barrier layer. The method further includes initiating a removal process for the conductive layer and terminating the removal process prior to removing the barrier layer.

20 Claims, 14 Drawing Sheets

(56) References Cited

U.S. PATENT DOCUMENTS

| | | | |
|---|---|---|---|
| 5,886,808 A | 3/1999 | Skeldon et al. | |
| 6,666,983 B2 | 12/2003 | Marietti et al. | |
| 6,826,209 B1 | 11/2004 | Morita et al. | |
| 6,885,683 B1 | 4/2005 | Fermann et al. | |
| 7,173,212 B1 | 2/2007 | Semak | |
| 7,256,930 B2 | 8/2007 | Liu | |
| 7,428,253 B2 | 9/2008 | Murison et al. | |
| 7,443,893 B2 | 10/2008 | Murison et al. | |
| 7,742,511 B2 | 6/2010 | Murison et al. | |
| 8,237,082 B2 | 8/2012 | Beck et al. | |
| 2002/0110960 A1* | 8/2002 | Kim et al. | 438/151 |
| 2003/0183603 A1* | 10/2003 | Forsman et al. | 219/121.6 |
| 2005/0041976 A1* | 2/2005 | Sun et al. | 398/92 |
| 2005/0061789 A1 | 3/2005 | Nagai et al. | |
| 2005/0067388 A1* | 3/2005 | Sun et al. | 219/121.69 |
| 2005/0088724 A1 | 4/2005 | Lee et al. | |
| 2005/0224111 A1* | 10/2005 | Cunningham et al. | 136/256 |
| 2005/0226287 A1* | 10/2005 | Shah et al. | 372/25 |
| 2005/0274702 A1 | 12/2005 | Deshi | |
| 2006/0192105 A1 | 8/2006 | Zare et al. | |
| 2006/0228897 A1 | 10/2006 | Timans | |
| 2007/0062919 A1 | 3/2007 | Hamada et al. | |
| 2007/0272666 A1 | 11/2007 | O'Brien et al. | |
| 2008/0035614 A1 | 2/2008 | Smart | |
| 2009/0074019 A1 | 3/2009 | Wong et al. | |
| 2009/0165849 A1* | 7/2009 | Chan et al. | 136/256 |
| 2009/0188543 A1 | 7/2009 | Bann | |
| 2009/0245301 A1* | 10/2009 | Peng et al. | 372/25 |
| 2009/0245302 A1* | 10/2009 | Baird et al. | 372/25 |
| 2009/0323741 A1 | 12/2009 | Deladurantaye et al. | |
| 2011/0142084 A1 | 6/2011 | Reid et al. | |
| 2011/0162684 A1* | 7/2011 | Kim et al. | 136/244 |
| 2011/0189811 A1* | 8/2011 | Stephens et al. | 438/72 |
| 2011/0233177 A1 | 9/2011 | Panarello et al. | |
| 2011/0240614 A1 | 10/2011 | Panarello et al. | |

FOREIGN PATENT DOCUMENTS

| | | |
|---|---|---|
| JP | 2002231986 A | 8/2002 |
| JP | 2005088053 | 4/2005 |
| JP | 2007503125 A | 2/2007 |
| WO | WO2004/107510 A2 | 12/2004 |
| WO | 2007085516 A1 | 8/2007 |
| WO | 2008056116 A1 | 5/2008 |

OTHER PUBLICATIONS

Machine translation of Japan Patent document No. 5-206,548, Sep. 2013.*

"A Unique Laser Process for Rapid Patterning of Thin Films", 4 pages, retrieved from Coherent website (www.Coherent.com) on Apr. 16, 2012.

"Scribing and Patterning of Transparent Conducting Oxides with a High Energy Picosecond Fiber Laser", 2 pages, retrieved from Fianium website (www.fianium.com)on Apr. 16, 2012.

Bernhard Klimt, "Micromachining with Industrial Picosecond Lasers", Laser Technik Journal, No. 1, Jan. 2007, 40-43.

Di Teodoro et al., "High-Power Pulsed Fibre Source at 1567 nm," Electronics Letters, Nov. 25, 2004, vol. 40, Issue 24, pp. 1525-1526.

Dunsky et al., "Scribing thin-film solar panels", Industrial Laser Solutions for Manufacturing, Feb. 2008, 4 pages.

International Search Report and Written Opinion of PCT Application No. PCT/US2010/048805, mailed Nov. 2, 2010,8 pages total.

J.L.Offler, et al., "Depth Selective Laser Scribing for Thin-Film Silicon Solar Cells on Flexible Substrates", Photovoltaic Specialists Conference (PVSC), Jun. 7-12, 2009, 34th IEEE, 5 pages.

Jim Bovatsek et al., "Effects of Pulse Duration on the ns-Laser Pulse Induced Removal of Thin Film Materials Used in Photovoltaics", Society of Photo-Optical Instrumentation Engineers, Mar. 2009,13 pages.

Matsui et al., "Generation of wavelength tunable gain-switched pulses from FP MQW lasers with external injection seeding", IEEE Photonics Technology Letters, Aug. 1997; 9(8):1087-1089.

Rajesh S. Patel, et al., "Why Pulse Duration Matters in Photovoltaics", Laser Technik Journal, No. 1, Jan. 4, 2010, 21-24.

SA Belozerov, et al., "Mechanism of Advanced Evaporation of Glass Under the Action of Laser Radiation", Mar. 1977,355-357.

Skeldon et al., "A High-Bandwidth Electrical-Waveform Generator Based on Aperture-Coupled Striplines for OMEGA Pulse-Shaping Applications," CLEO 98. Technical Digest. Summaries of papers presented at the Conference on Lasers and Electro-Optics, 1998., May 3-8, 1998, pp. 345-356.

Zhang et al., "Tunable dual-wavelength picosecond pulse generation by the use of two Fabry-Perot laser diodes in an external injection seeding scheme", Technology Letters, Jan. 2002; 14( 1 ):92-94.

"Amorphous Silicon Thin Film Solar Cell Scribing," Industrial Laser Applications Lab, No. 2, Jun. 2011, 2 pages.

"Standard Thermodynamic Properties of Chemical Substances", CRC Press LLC, May 5, 2000, CRC Handbook of Chemistry and Physics, 57 pages.

"Direct Write Laser Patterning, Dry Etching and Structuring of TCO coatings on Glass & Plastic Displays at Laserod", LIA Handbook of Laser Materials Processing, May 1, 2001, 8 pages.

Becker et al., "Polymer Microfabrication Technologies for Microfluidic Systems", Anal Bioanal Chem, Nov. 8, 2007, 390:89-111.

Bityurin, et al., "Models for Laser Ablation of Polymers," Chem. Rev. 103, Jan. 28, 2003,519-552.

Han et al., "Interaction Between Pulsed Laser and Materials", Lasers—Applications in Science and Industry, Dec. 2011, pp. 109-130.

Holl, et al., "Microfluidic Materials: Polymeric Laminate Technology", Sep. 7, 2001,6 pages.

Rana, Viren V. et al., "Selective Removal of Dielectric Layers Using Picosecond UV Pulses", Proc. of SPIE vol. 7193, Mar. 5, 2009, 8 pages.

Shin, Young C. et al., "High Precision Scribing of Thin Film Solar Cells by a Picosecond Laser", Proceedings of 2011 NSF engineering Research and Innovation conference Atlanta, Georgia, Jan. 4-7, 2011, 7 pages.

Tseng, et al., "Laser Scribing of indium tin oxide (ITO Thin Films Deposited on Various Substrates for Touch Panels," Applied Surface Science, 257, Dec. 5, 2010,1497-1494.

Tseng. et al., "The effect of laser patterning parameters on fluorine-doped tin oxide films deposited on glass substrates," Applied Surface Science, 257, Aug. 15, 2011, 8813-8819.

Wang, et al., "Thickness effect on laser-induced-damage threshold of indium-tin oxide films at 1064nm," Journal of Applied Physics 110, Dec. 9, 2011,5 pages.

Batzill et al., "The surface and materials science of tin oxide", Progress in Surface Science 79, 2005, 47-154. The month of publication is not available. In accordance with MPEP 609.04 (a), the year of this publication is sufficiently earlier than the effective U.S. filing date, Sep. 24, 2010, so that the particular month of publication is not an issue. See MPEP 609.04 (a).

JP Office Action in related case JP 2012-530929 dated Aug. 6, 2014, 6 pages.

* cited by examiner

METHOD AND APPARATUS TO SCRIBE THIN FILM LAYERS OF CADMIUM TELLURIDE SOLAR CELLS

CROSS-REFERENCES TO RELATED APPLICATIONS

This application is a continuation-in-part of U.S. patent application Ser. No. 12/889,435, filed on Sep. 24, 2010, (now U.S. Pat. No. 8,847,112) entitled "Method and Apparatus to Scribe a Line in a Thin Film Material Using a Burst of Laser Pulses With Beneficial Pulse Shape," which claims priority to U.S. Provisional Patent Application No. 61/245,582, filed on Sep. 24, 2009, entitled "Method and Apparatus to Scribe a Line in a Thin Film Material Using a Burst of Laser Pulses With Beneficial Pulse Shape," the disclosures of which are hereby incorporated by reference in their entirety for all purposes.

BACKGROUND OF THE INVENTION

The present invention relates generally to laser processing of materials. More particularly, the present invention relates to methods and apparatus employing a series of laser pulses which have been specifically shaped to provide better processing quality and higher throughput in laser processing applications. The present invention also relates to scribing of thin film materials on a substrate. However, the invention has broader applicability and can be applied to other applications and materials.

Pulsed laser sources, such as Nd:YAG lasers, have been used to perform laser-based material processing for applications such as marking, engraving, micro-machining, cutting, and scribing. One such process where lasers are commonly used is scribing lines in a thin film of material on a thicker substrate. A thin film is defined in very general terms as a layer of material which is only a few molecules thick. In practice, a thin film is typically between 25 nm and 2 microns in thickness. A substrate is a material upon which the thin film is deposited and typically the substrate is substantially thicker than the thin film. There are many examples of the use of thin films in areas such as electronic devices, electro-optical devices, optical devices, and corrosion protection. For example, photovoltaic or solar cells can have thin films of amorphous silicon, cadmium telluride, copper indium diselenide, copper indium gallium diselenide, or molybdenum, and electrodes made using thin films of transparent conductive oxide (TCO) material such as indium tin oxide (ITO), zinc oxide (ZnO) and oxides of other metals such as aluminum or molybdenum. Thin films of these and other materials are also used in flat panel displays and digital displays.

Scribing a line in a thin film material on a thicker substrate means to remove all the thin film material down to the substrate and do this along a line. For relatively thick lines, a knife can be used but it often results in rough edges and incomplete removal of the thin film material. The width of the line required in electronic devices can be very thin. Lasers are used for the application of scribing lines in thin film materials because they can be used to cut a very thin line and cleanly ablate the thin film material.

When scribing TCO, one parameter that is monitored is the resistivity achieved across the scribed line. The resistivity is affected by the amount of TCO material which is removed in the scribing process and the goal therefore is to remove all the TCO material in the groove being cut. One issue can be the amount of residue and debris which is generated in the cutting process. Ablated TCO material can fall across the groove as it is being scribed and thereby reduce the resistivity. Even if this does not happen immediately, the presence of debris can result in a reduction in resistivity sometime later if the debris is swept into the groove. A goal of the manufacturing process is to minimize the amount of residue and debris. For this reason, laser scribing often takes place with the beam passing through the glass substrate so that it is a "second-surface" process; although this helps to reduce the amount of residue and debris which sticks to the surface, some residue and debris remains. A typical acceptable value of resistivity is 200 MegaOhm although the ideal value depends on the application Another issue which does affect the quality of the laser scribing process is the generation of micro-cracks in the glass substrate or in the walls of the TCO material in the scribed groove. Over time, micro-cracks can propagate and become bigger with the result that mechanical flaws can appear at or across the scribed groove. Such occurrences are to be avoided since they can lead to device failure at some time after the standard "infant mortality" test phase and are thus difficult to counteract. Any physical deterioration of the thin film or the substrate by the laser pulse must be minimized. If present, micro-cracks and residue and debris can be observed using a high power optical microscope.

Depending on the application and the materials to be processed, it can be advantageous to be able to select the various characteristics of the laser pulses, including pulse energy, pulse width, pulse repetition rate, peak power or energy, and pulse shape, as appropriate to the particular application. Many examples exist of the careful control of pulse energy and power to optimize various materials processing applications.

Many existing high power pulsed lasers that are characterized by pulse energies greater than 0.5 mJ per pulse, rely on techniques such as Q-switching and mode locking to generate optical pulses. However, such lasers produce optical pulses with characteristics that are predetermined by the cavity geometry, the mirror reflectivities, and the like. Using such lasers, it is generally difficult to achieve an optimal pulse shape for the application at hand and therefore in many cases the laser processing has some deficiencies.

Therefore, what is needed is a system and method for scribing thin films of materials that improve the quality and the yield of the thin film scribing process.

SUMMARY OF THE INVENTION

The present invention relates to a method to scribe or cut a line in a thin film layer of material on a substrate using a burst of laser pulses shown schematically in FIG. 1a and consisting of individual pulses with a beneficially-formed temporal pulse shape, the use of which pulse shape instead of the conventional temporal pulse shape emitted by a laser has various advantages to improve the quality and the yield of the thin film scribing process. In one embodiment, the beneficially-shaped pulse can be described generally as a chair shape power temporal profile: an initial power spike followed by a significantly longer but lower-power plateau as shown schematically in FIG. 1b. In the scribing process where multiple pulses of the focused laser beam spot are scanned across a thin film material with some spot overlap, if a beneficially-shaped pulse of this general form is used instead of the conventional temporal pulse shape previously used, significant improvements in the quality of the scribing process are achieved. More specifically, the pulse length (FWHM full width half maximum) of each pulse in the burst of pulses is between 1 ns and 200 ns, and the pulse length FWHM of the spike is more than 0.3 ns but less than 30% of the pulse length of the full pulse. The peak power of the spike is between 1.5 times to 10 times the average peak power of the total pulse.

In another embodiment, the scribing process uses a burst of laser pulses shown schematically in FIG. 2a whereby each pulse has a beneficially-shaped pulse shape which can be described as a simple square-top pulse shape with a rapidly-rising leading edge as shown schematically in FIG. 2b. In the scribing process where multiple pulses of the focused laser beam spot are scanned across a thin film material with some spot overlap, if a beneficially-shaped pulse of this square top form is used instead of the conventional temporal pulse shape previously used, improvements in the quality of the scribing process are achieved. More specifically, the pulse length (FWHM full width half maximum) of the square pulse is between 1 ns and 200 ns.

The use of beneficial pulse shapes in the thin film scribing process has a number of advantages. For example, for laser scribing of zinc oxide thin films on a glass substrate which is a commonly-used material in solar panels, the use of the square temporal pulse shape results in no micro-cracks being generated in the glass substrate compared to the situation when a conventional laser temporal pulse shape is used which does result in significant micro-cracking in the substrate. On the same material, the use of the spike/plateau chair laser pulse shape results in no micro-cracks being generated in either the glass substrate or the scribed edges of the ZnO material compared to the situation when a conventional laser temporal pulse shape is used which results in significant micro-cracking in the glass substrate and on the scribed edges of the ZnO material. In addition, the use of the spike/plateau chair laser pulse shape also results in a significant reduction in the generation of ZnO residue and debris at the scribed line. The use of beneficial pulse shapes provides a significant improvement in the quality of the devices generated thereby and also a significant improvement in the yield as the number of devices which are acceptable to advance into the next stage of manufacturing is increased.

Most lasers are designed to provide maximum average power or pulse energy or repetition frequency and little consideration is given to the shape of the output pulse. The conventional temporal pulse shape of a free running, Q-switched or mode-locked laser as shown schematically in FIG. 3 has a rising leading edge, a rounded top and a falling edge which falls gradually. This pulse shape is determined primarily by the laser gain medium, the laser pumping means and the cavity design. However, it is possible to control the output pulse shapes of some laser systems. Pulsed laser sources such as diode lasers can be pulsed in a simple manner by providing a pulsed electronic drive signal. The pulse shape of the optical laser pulse thus generated can be pre-determined by choosing the shape of the electronic drive signal to the diode laser. The shaped signal from such a pulsed laser source can then be amplified in a laser amplifier such as a fiber laser amplifier. In one embodiment of the present invention, an oscillator amplifier laser system of this design is provided to generate a series of laser pulses with beneficially-shaped temporal pulse shapes suitable for scribing thin film materials.

In another embodiment, a more sophisticated laser system is provided to generate a series of laser pulses with beneficially-shaped temporal pulse shapes. U.S. patent application Ser. No. 12/210,028 titled "Method and system for a Pulsed Laser Source Emitting Shaped Optical Waveforms" filed Sep. 12, 2008, describes examples of tunable pulsed laser sources. The pulsed laser source includes a seed source adapted to generate a seed signal and an optical circulator having a first port coupled to the seed source, a second port, and a third port. The pulsed laser source also includes a modulator driver adapted to produce a shaped electrical waveform and an amplitude modulator coupled to the modulator driver and adapted to receive the shaped electrical waveform. The amplitude modulator is characterized by a first side coupled to the second port of the optical circulator and a second side. The pulsed laser source further includes a first optical amplifier characterized by an input end and a reflective end. The input end is coupled to the second side of the amplitude modulator. Moreover, the pulsed laser source includes a second optical amplifier coupled to the third port of the optical circulator. U.S. Pat. No. 7,428,253 titled "Method and System for Pulsed Laser Source with Shaped Optical Waveforms" issued Sep. 27, 2008 also describes examples of tunable pulsed laser sources.

In yet another embodiment, another laser design is provided to generate a series of laser pulses with beneficially-shaped temporal pulse shapes. U.S. Provisional Application No. 61/186,317, describes examples of stable pulsed laser sources. The pulsed laser source includes a stabilizing source adapted to generate stabilizing optical radiation, and an optical circulator having a first port coupled to the stabilizing source, a second port, and a third port. The pulsed laser source also includes a signal source adapted to produce a signal pulse of desired shape wherein the signal source is coupled to the second port of the optical circulator. The pulsed laser source further includes an optical amplifier coupled to the third port of the optical circulator. U.S. patent application Ser. No. 12/210,028, U.S. Pat. No. 7,428,253, and U.S. Provisional Application No. 61/186,317 are hereby incorporated by reference in their entirety for all purposes.

There are a number of designs which can be used to provide the beneficially-shaped temporal pulse shapes as desired. In a further embodiment of this invention, a materials processing system is disclosed to scribe or cut lines in a layer or layers of thin film materials on a substrate. The system includes a laser which provides a beneficially-shaped temporal pulse shape or shapes to optimally process thin film materials so as to achieve one or more of the following benefits; (1) to reduce or exclude the formation of microcracks in the substrate, (2) to reduce or exclude the formation of microcracks along the edges of the thin film cut region, (3) to reduce debris formation, and (4) to reduce surface area residue. As well as the laser, the materials processing system includes means to focus, image and scan the laser beam in a line across the thin film material so as to perform the scribing process, means to adjust the overlap of the scanned laser spot, and a computer to control the process. In a related embodiment, the materials processing system may also include means to change the wavelength of the laser using the process of harmonic generation.

Numerous benefits are achieved using the present invention over conventional techniques. For example, in an embodiment according to the present invention, high power, pulsed lasers suitable for laser scribing of thin film materials are provided that utilize a compact architecture that is inexpensive in comparison to lasers with comparable performance characteristics. Furthermore, in an embodiment according to the present invention, pulsed lasers suitable for laser scribing of thin film materials are provided such that the optical pulses can be shaped to optimize the laser pulse profile for said scribing of thin film materials. Depending upon the embodiment, numerous benefits exist including for example improvements in quality and yield of the processed items. These and other benefits have been described throughout the present specification and more particularly below. Various additional objects, features and advantages of the present invention can be more fully appreciated with reference to the detailed description and accompanying drawings that follow.

DETAILED DESCRIPTION OF THE INVENTION

In the manufacturing process of solar cells, flat panel displays, and digital displays, a thin film of a transparent conducting oxide (TCO) material deposited on a glass substrate must be segmented by scribing lines in the TCO material, thereby segmenting to provide electrical isolation between the TCO segment on one side of the line and the TCO segment on the other side of the line. Scribing a line using a pulsed laser is a multiple pulse process using a burst of many laser pulses whereby each pulse is focused to a spot on the thin film and the spot is scanned along the desired line to be scribed such that there is some overlap between each spot with the previous spot and the following spot. The width of the scribed line is determined primarily by the size of the focused laser spot. Widths for lines are scribed in a ZnO thin film on a glass substrate range from 10 microns to 100 microns although even thinner lines can be achieved. A certain amount of spot overlap is used to adequately remove the TCO material to leave a clean line on the substrate. Thus, the scribing process is essentially a multiple pulse process rather than a single pulse process. The amount of overlap from pulse to pulse can be used to control the scribing process. For example, the thicker the thin film, then the more overlap can be used. In one example the pulse overlap is 30% although that value can vary from as low as 10% to as much as 95% depending on the properties of the material being processed.

Figure 4:
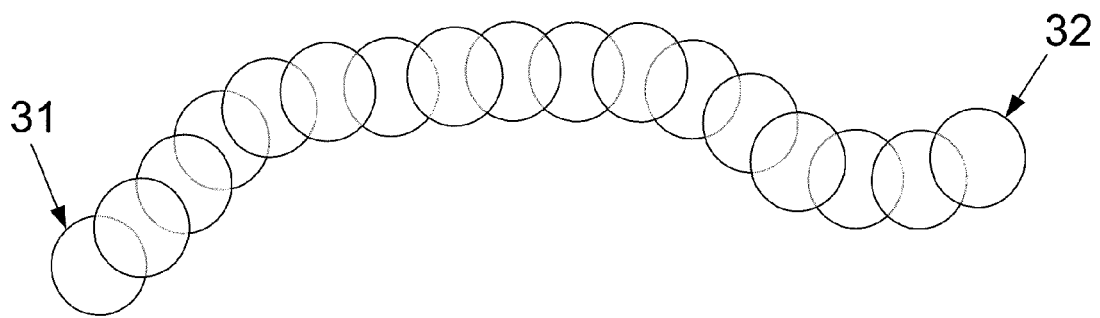
FIG. 4 is a schematic diagram showing the top view through the substrate of the laser scribing process in a thin film material using multiple laser pulses such that the processed area of each pulse overlaps the area processed by the previous pulse and also the next pulse. In this particular diagram, the spot overlap is approximately 30% but the value of spot overlap chosen for the process can range between 10% and 95%.

A schematic representation of laser scribing of a thin film is shown in FIG. 4. Although the scribing process is commonly a second-surface process, where the laser beam first passes through the substrate to access the thin film, it is also possible for the laser to be used to scribe the thin film directly without passing through the substrate. Laser scribing of thin films is a multiple pulse process requiring a burst of laser pulses including at least 10 pulses. Each pulse is focused or imaged to a spot at the thin film material. The first pulse 31 in the burst is directed so that the first spot is at the start position of the line to be scribed. Each subsequent pulse in the burst is directed to a spot which is adjacent to the previous spot but with some overlap value OL % between 10% and 95%. The value of spot overlap shown in FIG. 4 is about 30%. Thus, each pulse in the burst of pulses is directed to a position along the line to be scribed and the final pulse 32 is directed so that the spot from the final pulse is at the end of the line to be scribed. If N is the number of pulses in the burst, d is the diameter of the focused spot at the thin film, and OL % is the overlap value in percent, then the length L of the line which is scribed is given by the formula:

$$L=dN-d(N-1)(OL\%)/100$$

The width of the scribed line is a function of the focused spot size, the spot overlap, and the interaction with the thin film; ideally, the width of the scribed line is approximately the same as the diameter of the focused spot. The choice of spot overlap is a processing parameter which is changed to optimize the process. For thin materials, it is often possible to use a very low spot overlap such as 10% which provides a fast scribing speed up to 1 msec for example. For thicker materials, a larger overlap is usually chosen so that the thin film material is removed cleanly.

Figure 5A:
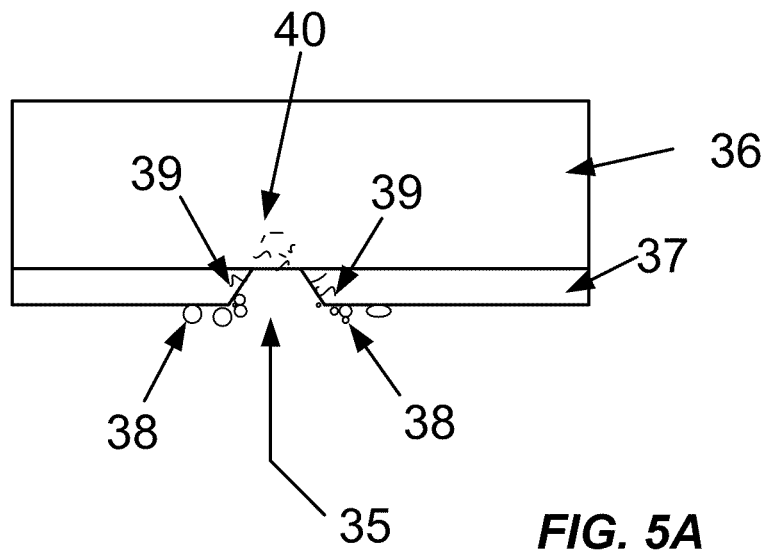
FIG. 5a is a schematic diagram showing a cross sectional side view of a single thin film material 37 deposited on a substrate 36 and with a groove 35 scribed in the thin film. Also shown are micro-cracking 40 of the substrate, micro-cracking 39 of the edges of the scribed thin film, and residue and debris 38 from the ablated thin film material which may adhere to the surface. Such micro-cracking and residue and debris is often the result of using a conventional laser pulse shape when laser scribing the thin film material.

FIG. 5a is a schematic diagram showing the side view of a single thin film material 37 deposited on a substrate 36 and with a groove 35 scribed in the thin film. Also shown are micro-cracking 40 of the substrate, micro-cracking 39 of the edges of the cut thin film, and residue and debris 38 from the ablated thin film material which may adhere to the surface. Such micro-cracking and residue and debris is often the result of using a conventional laser pulse shape such as that shown schematically in FIG. 3 when laser scribing the thin film material. It is an object of this invention to provide a method and an apparatus to improve the quality of thin film scribing by reducing or eliminating micro-cracking and residue and debris formation.

Figure 1A:
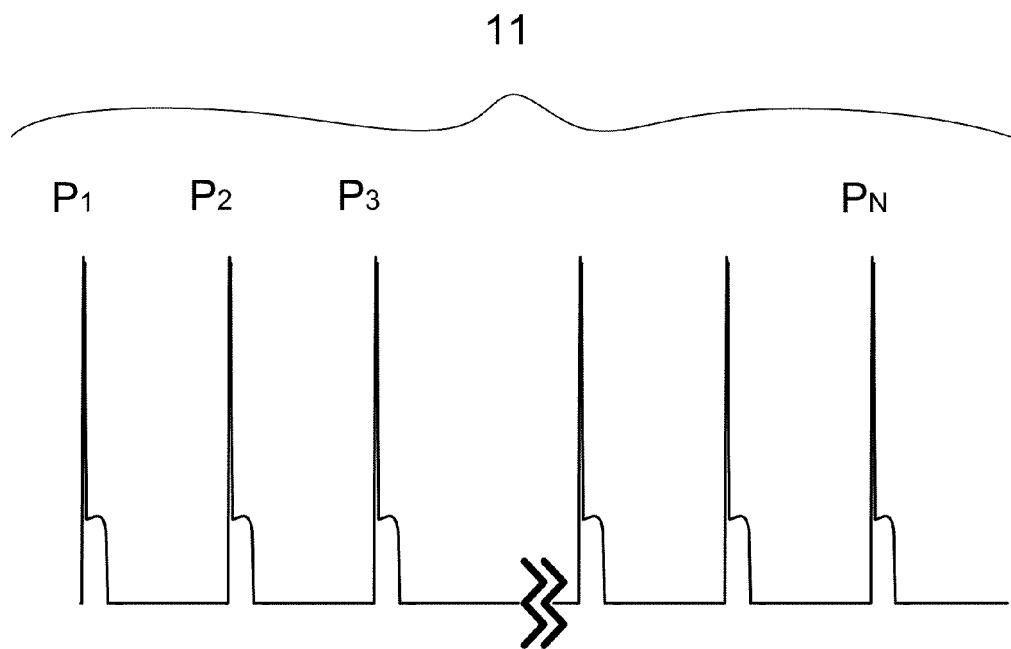
FIG. 1a is a schematic diagram of an embodiment showing a burst of pulses, with a beneficially-shaped pulse shape of the chair pulse format, suitable for scribing a line in a thin film material on a substrate. In this figure, time is on the horizontal axis and power is along the vertical axis.
Figure 2A:
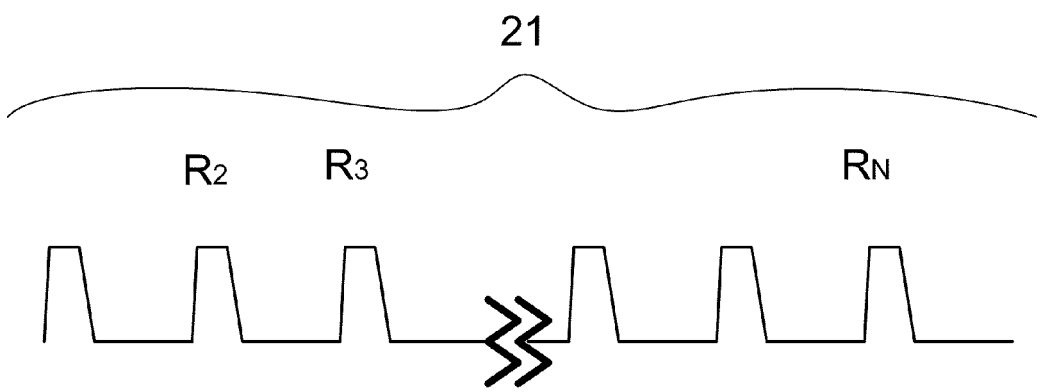
FIG. 2a is a schematic diagram of an embodiment showing a burst of pulses, with a beneficially-shaped pulse shape of the square pulse format, suitable for scribing a line in a thin film material on a substrate.
Figure 2B:
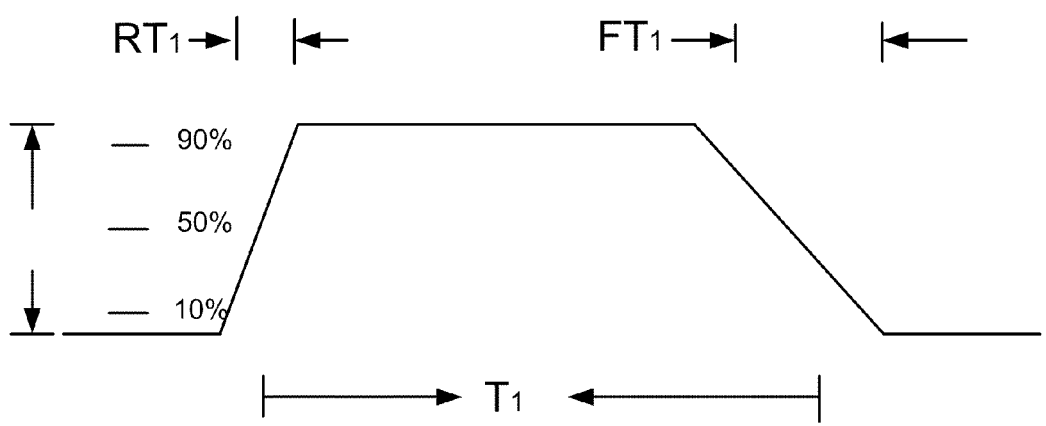
FIG. 2b a shows a flat-topped square pulse, where time is on the horizontal axis and power is along the vertical axis.
Figure 2C:
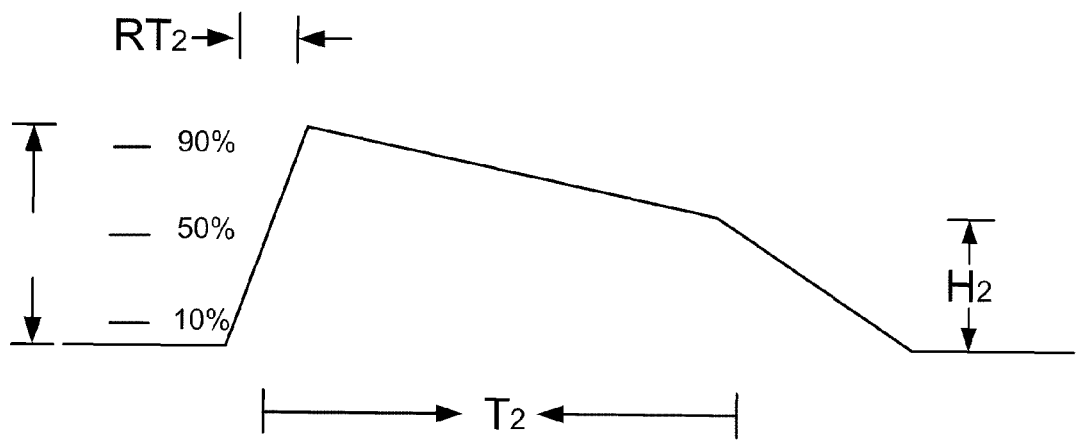
FIG. 2c shows a square pulse with droop where time is on the horizontal axis and power is along the vertical axis.
Figure 3:
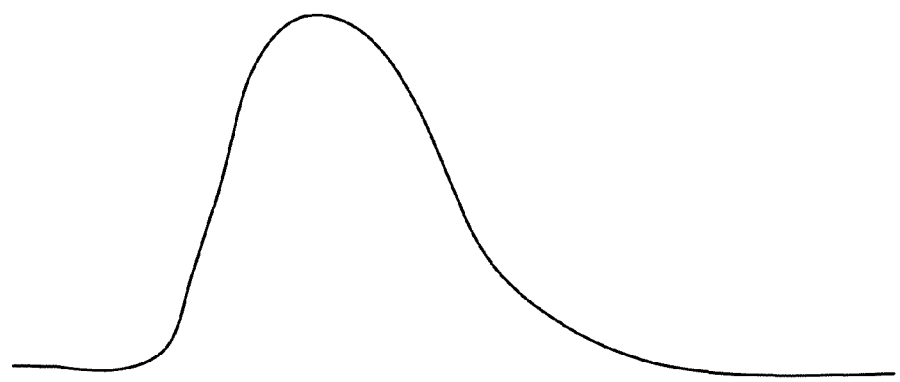
FIG. 3 is a schematic diagram showing temporal pulse shapes for conventional laser pulses used for scribing thin film materials on a substrate. In this figure, time is on the horizontal axis and power is along the vertical axis.
Figure 5B:
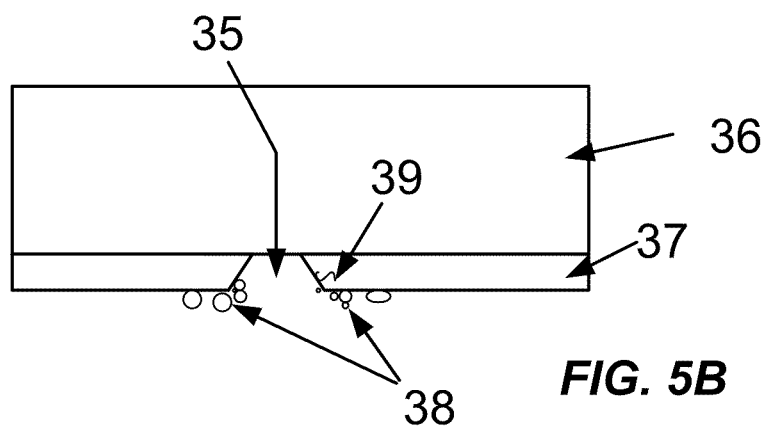
FIG. 5b is a schematic diagram showing a cross sectional side view of the structure shown in FIG. 5a, but without micro-cracking in the substrate and a reduction of micro-cracking of the edge of the scribed thin film, obtained using another embodiment of this invention.

FIGS. 1a and 2b show bursts of pulses 11 and 21 respectively with various beneficial pulse shapes according to embodiments of the invention that have improved the quality of scribing a line in a thin film on a glass substrate compared to the lesser quality obtained using bursts of laser pulses with a conventional pulse shape shown in FIG. 3 to do the same process. Each burst contains at least 10 pulses. In particular, FIG. 2a shows a burst of pulses according to one embodiment of this invention. FIG. 2b shows a beneficial pulse shape according to one embodiment of the invention with a pulse length FWHM of T1, front edge risetime (10% to 90%) of RT1, and a back edge falltime (90% to 10%) of FT1. The peak power of the flat top is H1. Compared to the lines scribed using bursts of pulses with conventional pulse shape which showed significant micro-cracking of the glass substrate and the edge of the ZnO scribe as shown in FIG. 5a, the lines scribed using burst of pulses of the square pulse shape of FIG. 2b show no micro-cracking in the glass substrate and a reduction in the micro-cracks in the edge of the ZnO scribed region as shown schematically in FIG. 5b. In one embodiment of the invention, lines of width 54 microns scribed in a ZnO film of thickness 450 nm on a glass substrate of thickness 6 mm using bursts of pulses from a laser of wavelength 1064 nm with a pulse shape of FIG. 2b, with pulse energy of 135 microJoules, a spot size of 50 microns, a pulse length of 50 ns, values of RT1 and FT1 of 1 ns, repetition rate 36,000 pulses per second, and various values of spot overlap (including 10%, 25% and 50% overlap) show no micro-cracking of the substrate. In addition, the efficiency of the scribing process increases as the width of the material removed increases from 44 microns with the conventional pulse shape to 54 microns for the square pulse shape with the same pulse energy. Changing the pulse shape to a square pulse shape does provide a definite increase in the width of the scribed line and also effectively prevents the formation of micro-cracking in the glass substrate. The specific parameters of an embodiment according to this invention are not restricted to these values, however. In one embodiment, the pulse length T1 of the square pulse would be between 1 ns and 200 ns. The risetime RT1 of the square pulse would be more than 0.3 ns but less than 10% of the pulse length T1. The falltime FT1 would be less than 30% of the pulse length T1. Similar improvements would also be achieved even if the square pulse shape had some droop as shown in FIG. 2c as long as the droop was such that H1-H2 was less than 50% of H1.

Similar improvements will be achieved using different values of spot size and scribing speed. For example, similar improvements in the quality when scribing a line of width 25 microns were observed using a laser with pulse energy 42 microJoules operating at 72,000 pulses per second focused to a 25 micron spot size, with various values of spot overlap (including 10%, 25% and 50% overlap). Likewise, similar improvements in the quality of the ZnO scribing were observed using a laser with pulse energy 7 microJoules operating at 260,000 pulses per second focused to a 10 micron spot, and various values of spot overlap (including 10%, 25% and 50% overlap). In all cases, the use of a square-topped pulse as described herein results in the above-noted improvements in scribing quality.

For very thin films, a small overlap can be used to remove the material at each focused spot, but as the thickness of the material increases it can be better to increase the spot overlap rather than increase the pulse energy. Low spot overlap can lead to more modulation in the edge of the scribed line where the spots overlap than in the edges of the scribed line if the spot overlap is high. However, this sharp point at the edge of each spot overlap is not the same as the micro-cracking seen at a thin film edge. Therefore, in one embodiment, the sharp edge where spots overlap is reduced, without affecting micro-cracking for either of the pulse shapes, by increasing the spot overlap.

Figure 1B:
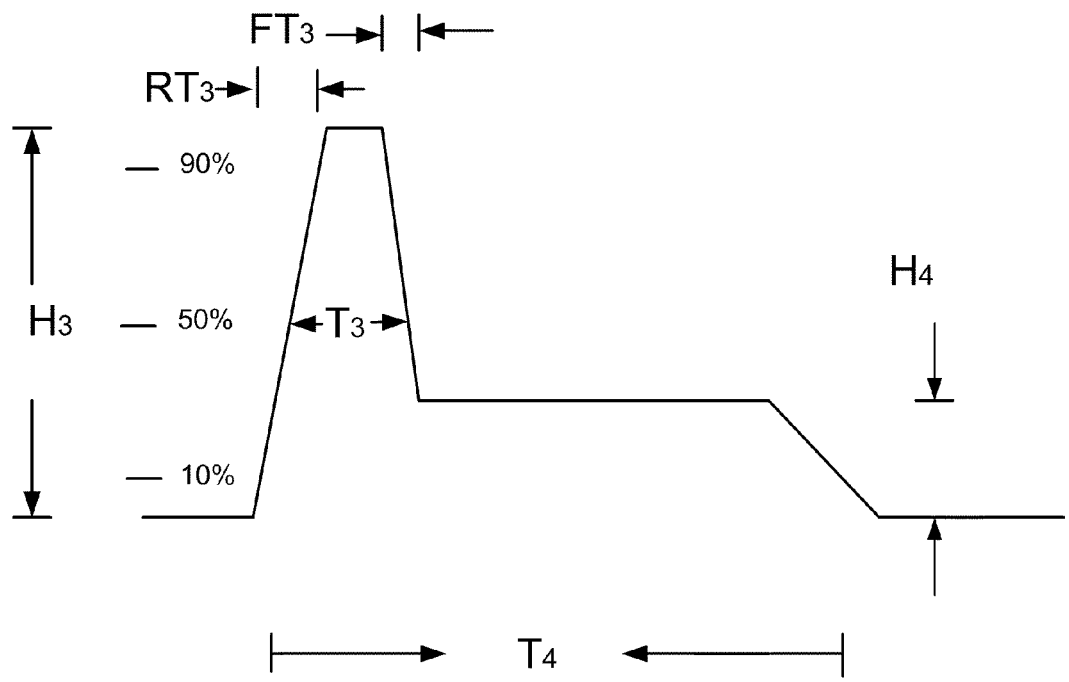
FIG. 1b shows an embodiment of a spike/plateau chair pulse shape.
Figure 1C:
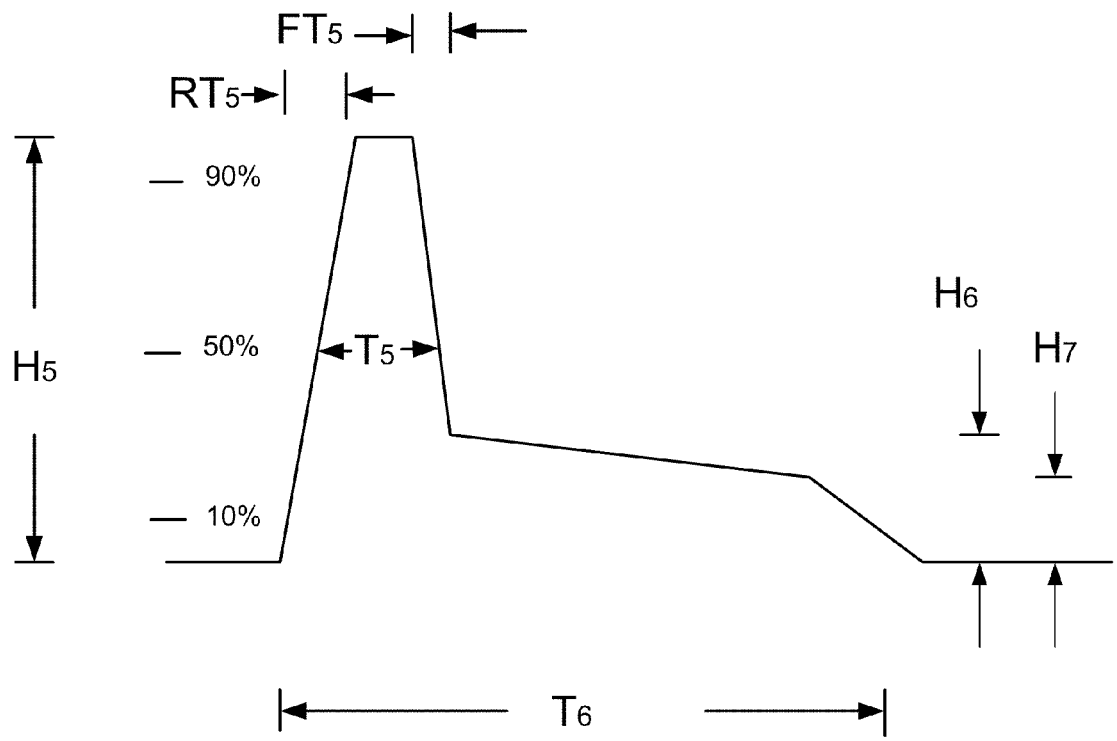
FIG. 1c shows the embodiment of a spike/plateau chair pulse with droop.
Figure 1D:
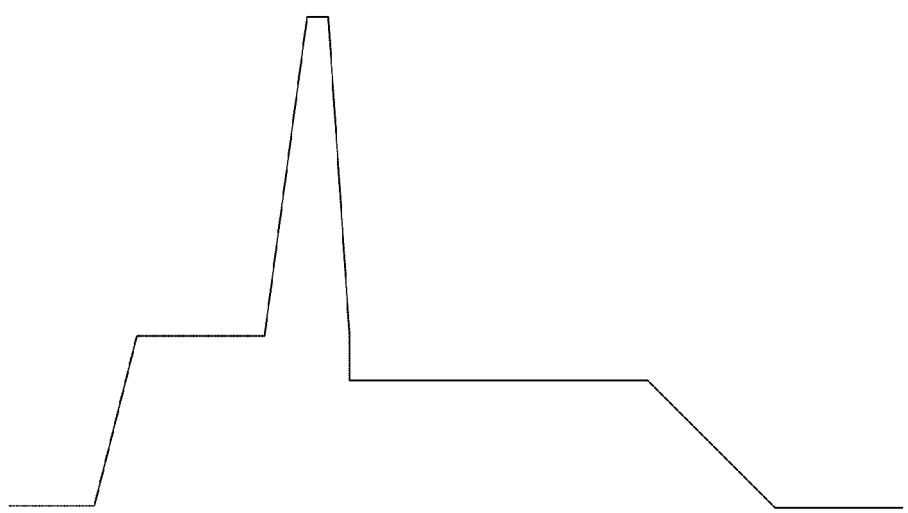
FIG. 1d shows another embodiment of a chair pulse shape.
Figure 1E:
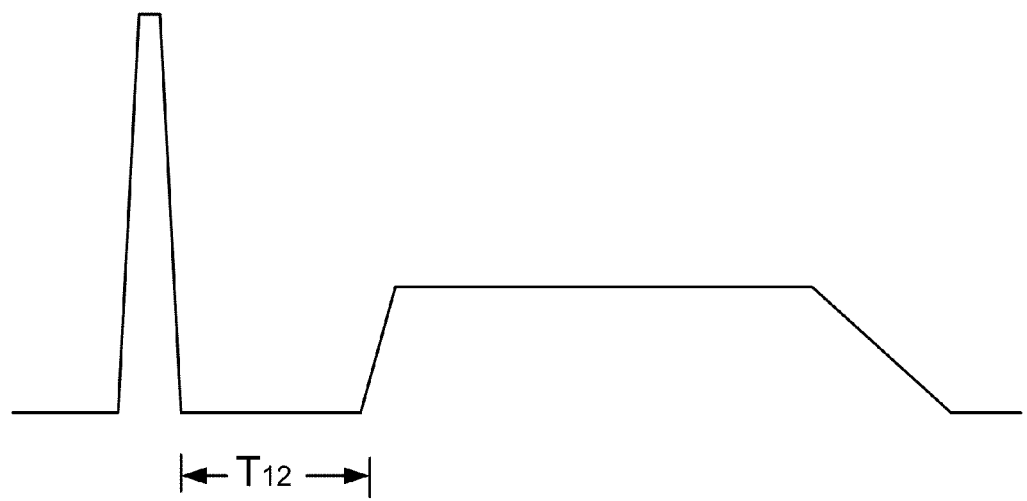
FIG. 1e shows a further embodiment of the chair pulse shape.
Figure 5C:
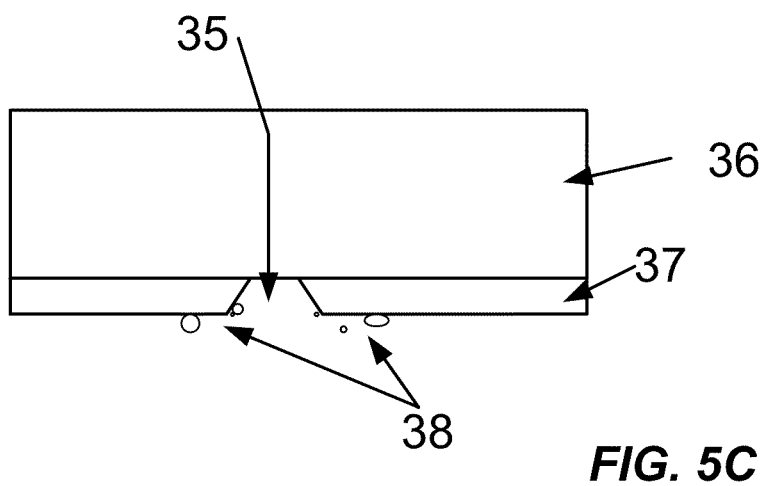
FIG. 5c is a schematic diagram showing a cross sectional side view of the structure shown in FIG. 5a, but without micro-cracking in both the substrate and the edge of the scribed thin film and also a reduction in the amount of residue and debris, obtained using another embodiment of the invention.

In another embodiment of the present invention, a burst of laser pulses as shown schematically in FIG. 1a is used to etch a thin film material. Each burst of pulses includes at least 10 pulses. In an embodiment, each pulse in the burst of pulses has a beneficial pulse shape shown schematically in FIG. 1b described as the spike/plateau chair pulse shape. In FIG. 1b, a pulse shape consists of two regions: an initial spike with peak power H3, risetime RT3 and width FWHM T3, and a flat plateau with peak power H4 and falltime FT4. The total pulse length at 10% peak power is T4. Compared to the lines scribed in a ZnO thin film using bursts of pulses with conventional pulse shape of FIG. 3 which show significant micro-cracking of the glass substrate and the edge of the ZnO scribe as shown in FIG. 5a, the lines scribed using a burst of pulses having chair pulse shape of FIG. 1b show no micro-cracking in the glass substrate and no micro-cracking in the edge of the ZnO scribed region as shown in FIG. 5c. In addition, there is an increase in the efficiency of the scribing process as the scribed lines are wider in a similar manner to that described earlier for the square pulse shape. For the chair pulse shape of FIG. 1b, there is also a significant reduction in ZnO residue and debris generated in the scribing process compared to that observed when the conventional pulse shape of FIG. 3 is used. Specific parameters to scribe a line of width 54 microns in a thin film ZnO layer of thickness 450 nm on a glass substrate of thickness 6 mm using a burst of laser pulses according to an embodiment of this invention with the pulse shape of FIG. 1b are laser wavelength 1064 nm, pulse energy 135 microJoules, repetition rate 36,000 pulses per second, spot size 50 microns, pulse length T4 of 50 ns, risetime RT3 of 1 ns, falltime FT3 of 1 ns, spike pulse length T3 of 10 ns, the ratio of power H3/H4 to be 3:1, and various values of spot overlap (including 10%, 25% and 50% overlap). Scribing speeds higher than 1 msec may be achieved. The specific parameters of an embodiment according to this invention are not restricted to these values, however. In one embodiment, the pulse length T4 would be between 1 ns and 200 ns, and the pulse length T3 of the spike would be more than 0.3 ns and less than 30% of T4. The risetime RT3 would be more than 0.1 ns and less than 30% of T3, and the ratio H3/H4 would be greater than 1.5 but less than 10. The spot overlap would be between 10% and 95%.

Similar improvements will be achieved using different values of spot size and scribing speed. For example, similar improvements in the quality of the ZnO scribing were observed using a laser with pulse energy 34 microJoules operating at 72,000 pulses per second focused to a 25 micron spot size with various values of spot overlap (including 10%, 25% and 50% overlap). Likewise, similar improvements in the quality of the ZnO scribing were observed using a laser with pulse energy 4 microJoules operating at 260,000 pulses per second focused to a 10 micron spot and with various values of spot overlap (including 10%, 25% and 50%). In all cases, the use of a chair-shaped pulse as described herein results in the above-noted improvements in scribing quality.

As shown in FIG. 1, there are other variants of the chair pulse shape which would provide some benefits in the quality of thin film scribing process. For example, a spike/plateau shaped pulse with droop like that shown in FIG. 1c would be expected to provide significant benefits as long as H6-H7 is less than 50% of H6. It would also be possible to use a pulse shape with the spike on the middle of the plateau as shown in FIG. 1d or a pulse shape with the spike displaced by a time T12 from the plateau as shown in FIG. 1e. In one embodiment a value T12 less than 5 ns is used when scribing a line in a ZnO thin film on a glass substrate. The embodiments described in this application do not necessarily encompass all possibilities to form beneficial pulse shapes in a burst of laser pulses to optimize the scribing of a line in a thin film of ZnO to thereby improve the quality and yield of the process over that which can be achieved using a laser with a conventional pulse shape. One with ordinary skill in the art would recognize many variations, modifications, and alternatives.

The application of embodiments of this invention is not restricted to ZnO thin films or TCO thin films. The use of beneficial pulse shapes according to embodiments disclosed in this invention will be of benefit in scribing thin films of many materials. And, the use of beneficial pulse shapes in this application will benefit from the use of other wavelengths than 1064 nm as appropriate for the thin film material to be scribed. The choice of laser wavelength is determined in part by the absorption of the material to be ablated. As well as 1064 nm, lasers are available at many other wavelengths including 1032 nm, 1.3 microns, 1.5 microns, 2 microns and others. In addition, it is possible to achieve other wavelengths as required using nonlinear processes such as harmonic generation; in this case, a laser operating at 1064 nm can have the wavelength changed to 532 nm (green), 354 nm (near ultraviolet), 266 nm (ultraviolet) and so on. In some cases if the absorption is high at a shorter wavelength such as green or ultraviolet, the scribing process of a very thin film as herein described may benefit from the use of a harmonic wavelength.

The substrate of the thin film material is not restricted to glass. Another common substrate material is a polymer or plastic. In the case of scribing a film on the second surface of the substrate where the laser beam must pass through the substrate, the choice of laser wavelength is restricted to one for which the substrate is substantially transparent. However, the use of beneficial pulse shapes according to embodiments disclosed in this invention is not restricted to second surface scribing of thin film. The application of beneficial pulse shapes will be of equivalent benefit when scribing thin films directly without passing through the substrate.

Figure 6:
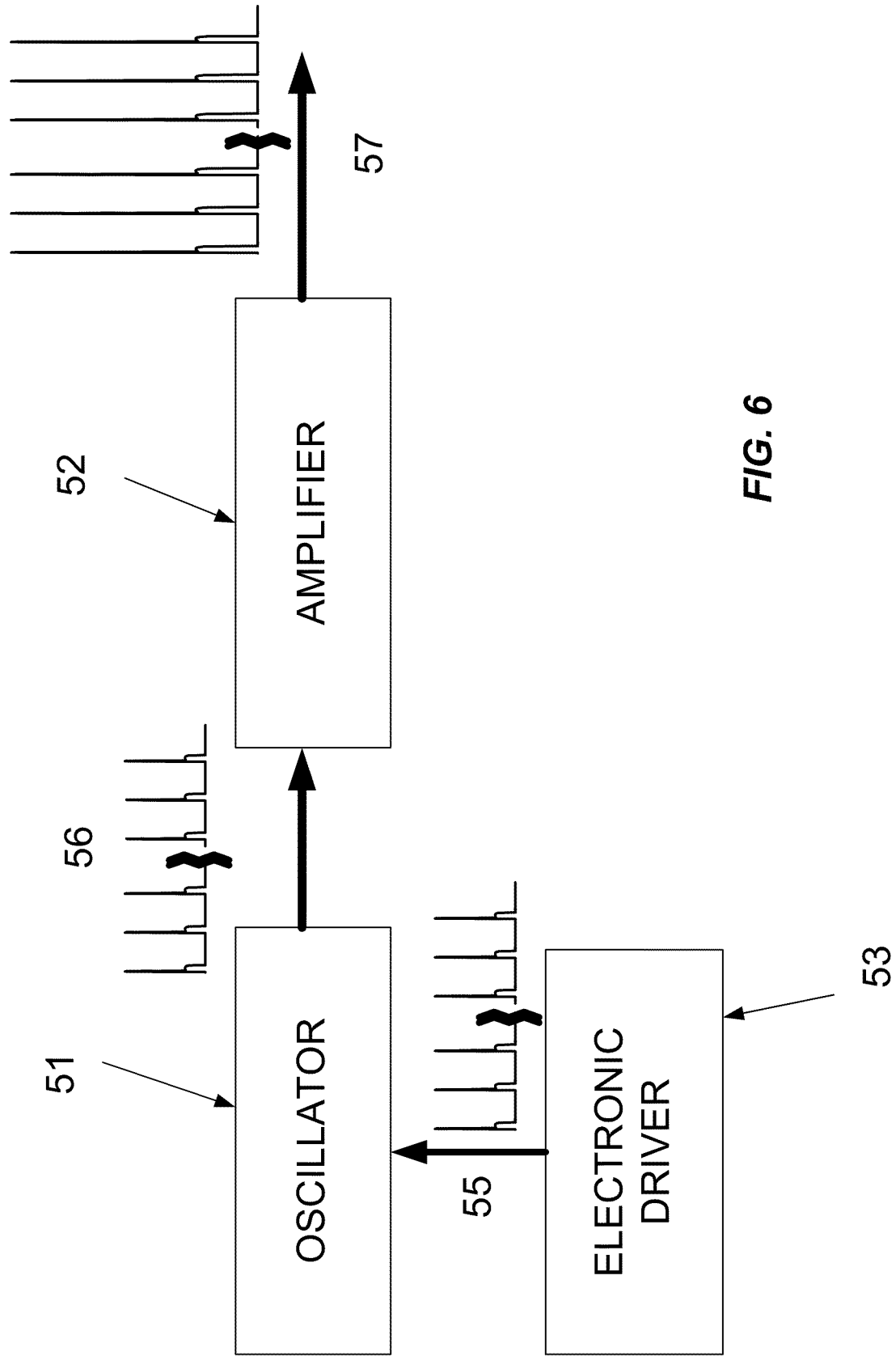
FIG. 6 is a simplified schematic illustration of a pulsed laser with tunable pulse characteristics providing an output burst of laser pulses with a beneficial pulse shape according to an embodiment of the present invention.

With reference to FIG. 6, a laser system capable of generating beneficial pulse shapes of the kind disclosed in this application is shown. This laser system includes an oscillator 51, powered by an electronic driver 53, and includes an amplifier 52. Pulsed laser sources such as diode lasers can be pulsed in a simple manner by providing a pulsed electronic drive signal. The pulse shape of each optical laser pulse in a burst 56 of pulses that is generated can be pre-determined by choosing the shape of the electronic drive signal 55 sent to the oscillator 51 by the electronic driver 53. The shaped signal from such a pulsed laser oscillator is then amplified in a laser amplifier such as a diode-pumped solid state rod laser or a fiber laser amplifier in such a manner that the pulse shape of each pulse in a burst 57 of output pulses is maintained substantially unchanged from that pulse shape provided by the oscillator.

The oscillator laser may consist of a semiconductor laser, a fiber laser, a diode laser, or a distributed feedback diode laser. In a particular embodiment, the pulsed signal source is a semiconductor diode laser operating at a wavelength of 1064 nm with a one watt peak pulse power, a repetition rate variable up to 500 KHz (kilohertz), a pulse width of 100 nanoseconds with a sub-nanosecond pulse risetime. In alternate embodiments, the peak optical power of the pulsed signal source can be lower or higher than one watt. For example, it can be 500 mW, 1 Watt, 2 Watts, 3 Watts, 4 Watts, 5 Watts or more. Also, the pulse width can be smaller or larger than 100 nanoseconds. For example, it can be 1 ns (nanosecond), 2 ns, 10 ns, 20 ns, 50 ns, 200 ns, 500 ns or more. In alternate embodiments, the optical pulse can be more complex and can comprise a beneficially-shaped pulse such as the square pulses of FIG. 4 or the chair-shaped pulses of FIG. 5. The oscillator laser is driven by an electronic driver such that the shape of the current pulse provided by the electronic driver is mimicked by the shape of the oscillator laser output pulse shape.

The output from the oscillator 51 is amplified in a laser amplifier module 52 consisting for example of a fiber laser amplifier or a diode-pumped solid state rod laser amplifier. In one embodiment of the present invention, the amplifier is an optical amplifier, including a pump that is coupled to a rare-earth-doped fiber loop through an optical coupler. Generally, a semiconductor pump laser is used as a pump, although pumping of optical amplifiers can be achieved by other means as will be evident to one of skill in the art. In a particular embodiment, optical amplifier includes a 5 meter length of rare-earth doped fiber, having a core diameter of approximately 4.8 microns and is doped with Ytterbium to a doping density of approximately $6 \times 10^{24}$ ions/m3. The amplifier also includes a pump, which is an FBG-stabilized semiconductor laser diode operating at a wavelength of 976 nm, and having an output power of 500 mW. In another particular embodiment, the optical amplifier 160 includes a 2 meter length of rare-earth doped fiber, having a core diameter of approximately 10 microns, and is doped with Ytterbium to a doping density of approximately $1 \times 10^{26}$ ions/m3. The amplifier can also include a pump which is a semiconductor laser diode having an output power of 5 W.

Although the example was given for a Ytterbium-doped fiber amplifier and a laser wavelength of 1064 nm, other examples of diode lasers, solid state lasers, and doped fibers operating at 1064 nm or operating at other wavelengths could be used in other embodiments of the present invention. These include for example erbium-doped fiber in the wavelength region 1550 nm and thulium-doped fiber in the wavelength region 2 to 3 microns. In alternative embodiments, multiple optical amplifiers are utilized downstream of the optical circulator 120 as appropriate to the particular applications.

Figure 7:
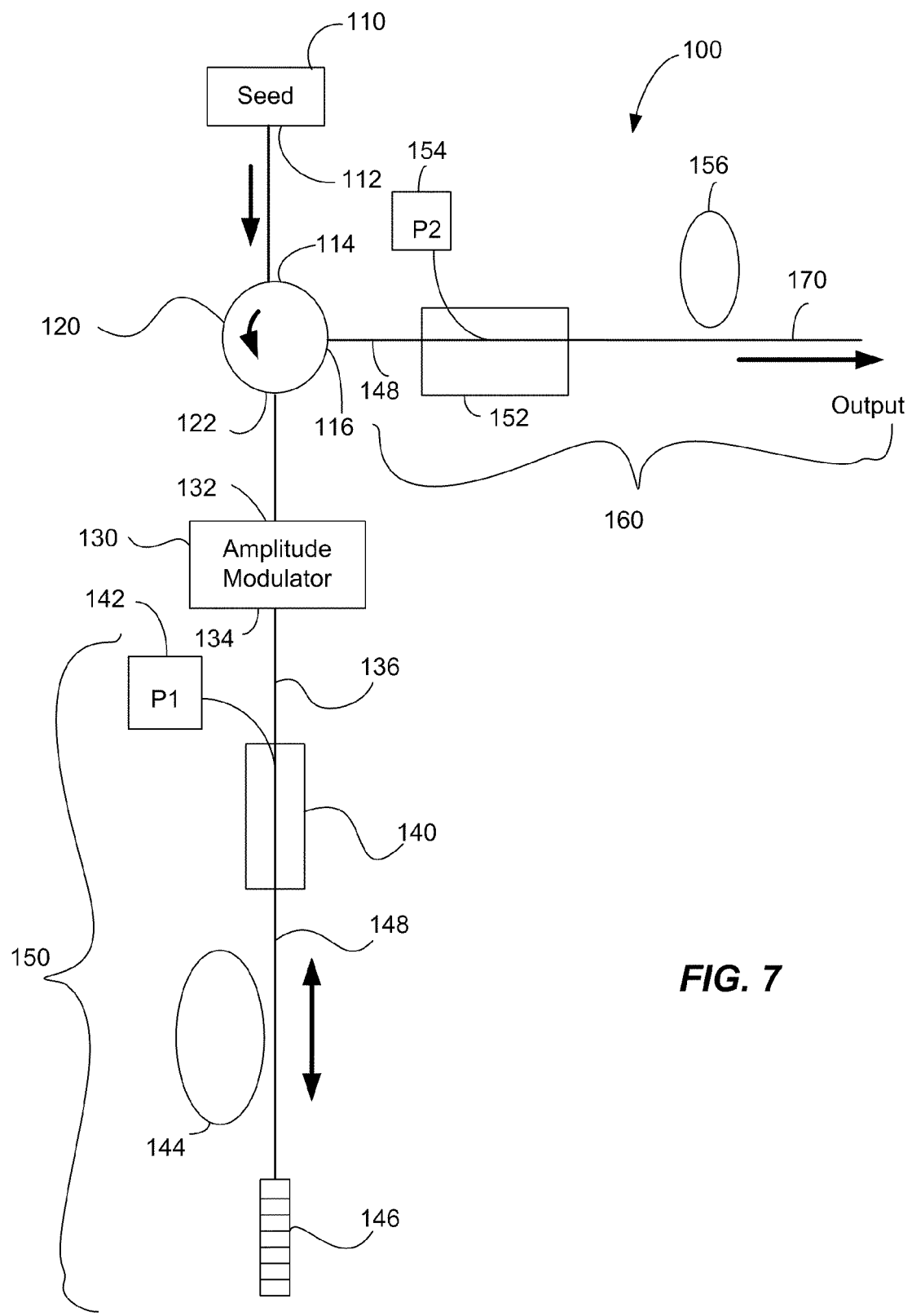
FIG. 7 is a simplified schematic illustration of a pulsed laser with tunable pulse characteristics providing an output burst of laser pulses with a beneficial pulse shape according to a an embodiment of the present invention.

With reference to FIG. 7, in an embodiment of the present invention, a pulsed laser source generating bursts of pulses of beneficial pulse shape is provided. The pulsed laser source includes a seed source 110 adapted to generate a seed signal and an optical circulator 120 having a first port 114 coupled to the seed source, a second port 122, and a third port 116. The pulsed laser source also includes an amplitude modulator 130 characterized by a first side 132 coupled to the second port 122 of the optical circulator and a second side 134. The pulsed laser source further includes a first optical amplifier 150 characterized by an input end 136 and a reflective end 146. The input end is coupled to the second side 134 of the amplitude modulator. Moreover, the pulsed laser source includes a second optical amplifier 160 coupled to the third port 116 of the optical circulator. Although FIG. 7 illustrates the use of one optical amplifier 160 coupled to the third port of the optical circulator, this is not required by some embodiments of the invention. In alternative embodiments, multiple optical amplifiers are utilized downstream of the optical circulator as appropriate to the particular applications. Additional description on embodiments of the present invention can be found in commonly assigned U.S. patent application Ser. No. 12/210,028 titled "Method and system for a Pulsed Laser Source Emitting Shaped Optical Waveforms" filed Sep. 12, 2008 which is a continuation in part of U.S. Pat. No. 7,428,253 titled "Method and System for Pulsed Laser Source with Shaped Optical Waveforms" issued Sep. 27, 2008, which are hereby incorporated by reference in their entirety for all purposes.

Figure 8:
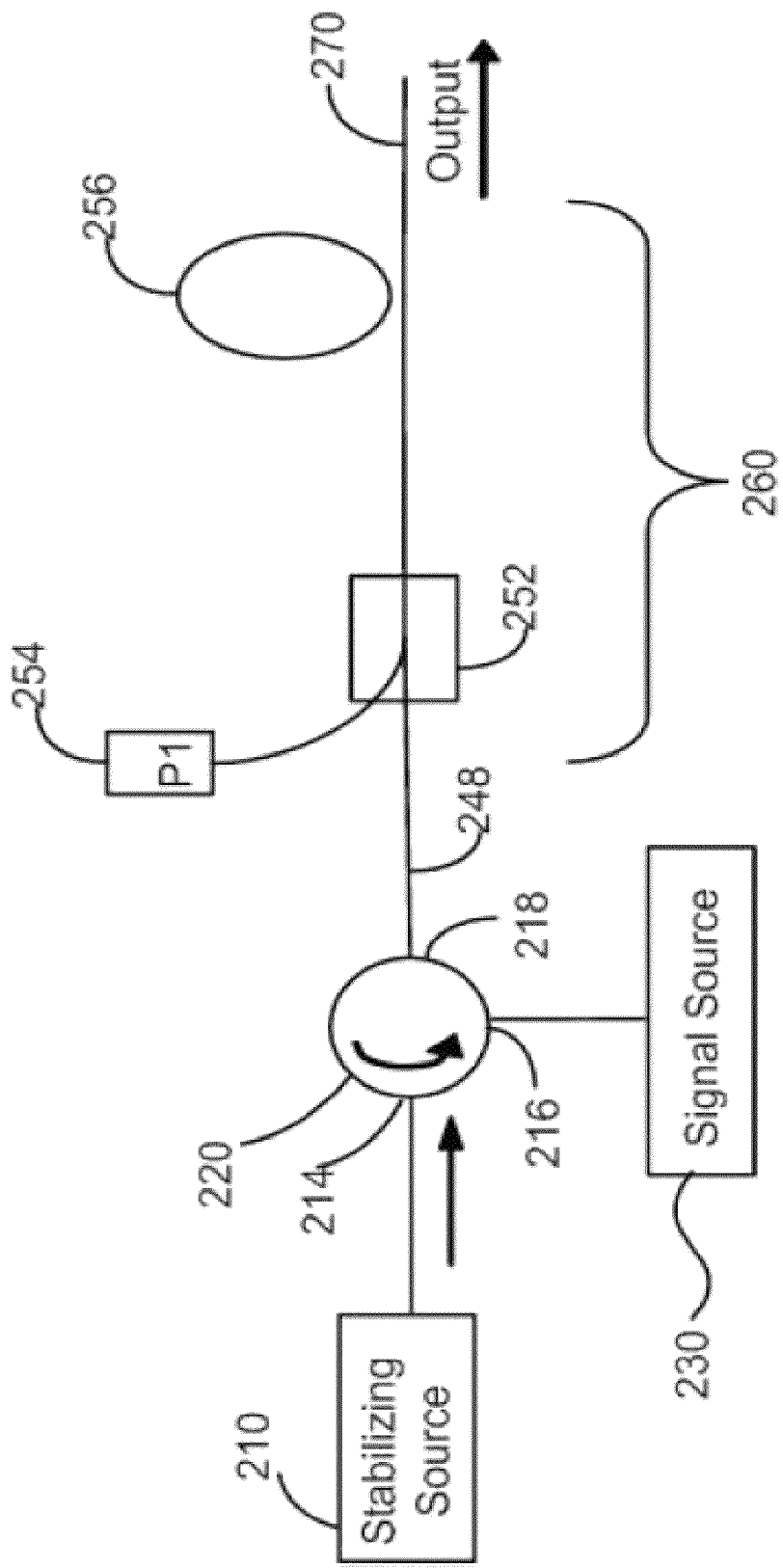
FIG. 8 is a simplified schematic illustration of a pulsed laser with tunable pulse characteristics providing an output burst of laser pulses with a beneficial pulse shape according to another embodiment of the present invention.

With reference to FIG. 8, in another embodiment of the present invention, a pulsed laser source generating bursts of pulses of beneficial pulse shape is provided. The pulsed laser source includes a stabilizing source 210 adapted to generate stabilizing optical radiation 216, and an optical circulator 220 having a first port 214 coupled to the stabilizing source, a second port 216, and a third port 218. The pulsed laser source also includes a signal source 230 adapted to produce a signal pulse of desired shape wherein the signal source is coupled to the second port 216 of the optical circulator. The pulsed laser source further includes an optical amplifier 260 coupled to the third port 218 of the optical circulator. Additional description on embodiments of the present invention can be found in commonly assigned U.S. Provisional Application No. 61/186,317, which is hereby incorporated by reference in its entirety for all purposes.

Figure 9:
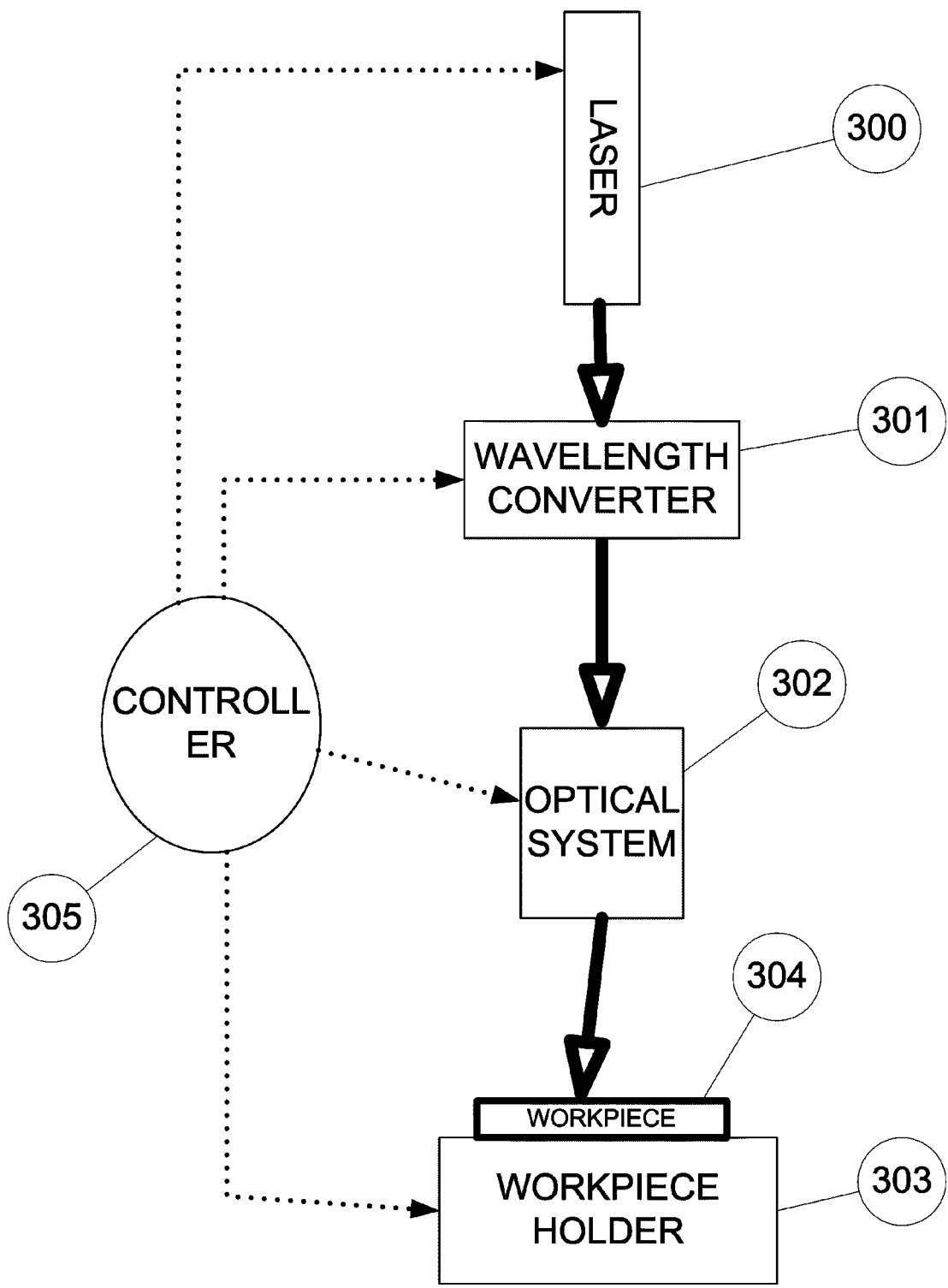
FIG. 9 is a simplified schematic illustration of a laser processing system suitable to scribe a line in a thin film on a substrate according to an embodiment of the present invention.

According to one particular embodiment of the present invention, FIG. 9 shows an exemplary laser processing system capable of scribing a line in a thin film material workpiece 304 using a laser generating a burst of pulses with beneficial pulse shape. The system includes a laser source 300, a wavelength converter 301, an optical system 302, a controller 305, and a workpiece 304 that is positioned on top of a workpiece holder 303. The laser source 300 provides laser pulses with certain characteristics, such as wavelength, pulse length, pulse shape, and pulse repetition rate. The wavelength may be selected by the controller. The wavelength may also be adjusted through the wavelength converter. The pulse length and pulse shape may be adjusted according to embodiments of the present invention to scribe a line in a thin film material workpiece using a burst of pulses with beneficial pulse shape.

A wavelength generated by the laser source 300 may be converted to a harmonic of a fundamental wavelength by the wavelength converter 301, such as a second, third, or fourth harmonic wavelength. Although some systems use different lasers, it is possible to obtain different wavelengths from one laser using a well-known process of harmonic generation in non-linear crystals. For example, ultraviolet light having a wavelength of approximately 353 nm may be obtained from an infrared laser having a wavelength of 1.06 µm by using harmonic tripling in a non-linear crystal. The wavelength converter may include a beam directing device, such as galvanometer-mounted mirrors. The mirrors may quickly change the path of a laser beam from the laser source to bypass the wavelength converter 302 may be used to adjust the spot size of the beam. The optical system may include lenses and mirrors for focusing a laser beam on the workpiece, and a component for directing the beam to various positions on the workpiece. In a specific embodiment, the component for directing the beam may be mirrors mounted on galvanometers. The controller may be used to control the optical system and the motion of the component for directing beam. For example, when scribing a line in a thin film workpiece 304, the optical system 302 may be controlled by the controller to scan the beam in a line along the surface of the workpiece such that each focused laser spot is directed to a location adjacent to the previous focused laser spot but with an overlap. In another embodiment, the optical system may focus the laser beam at the surface of the workpiece and the workpiece holder may be controlled by the controller to move the workpiece in a line such that each focused laser pulse impinges on a location adjacent to the previous focused laser pulse in the burst of laser pulses but with some spot overlap.

Figure 10:
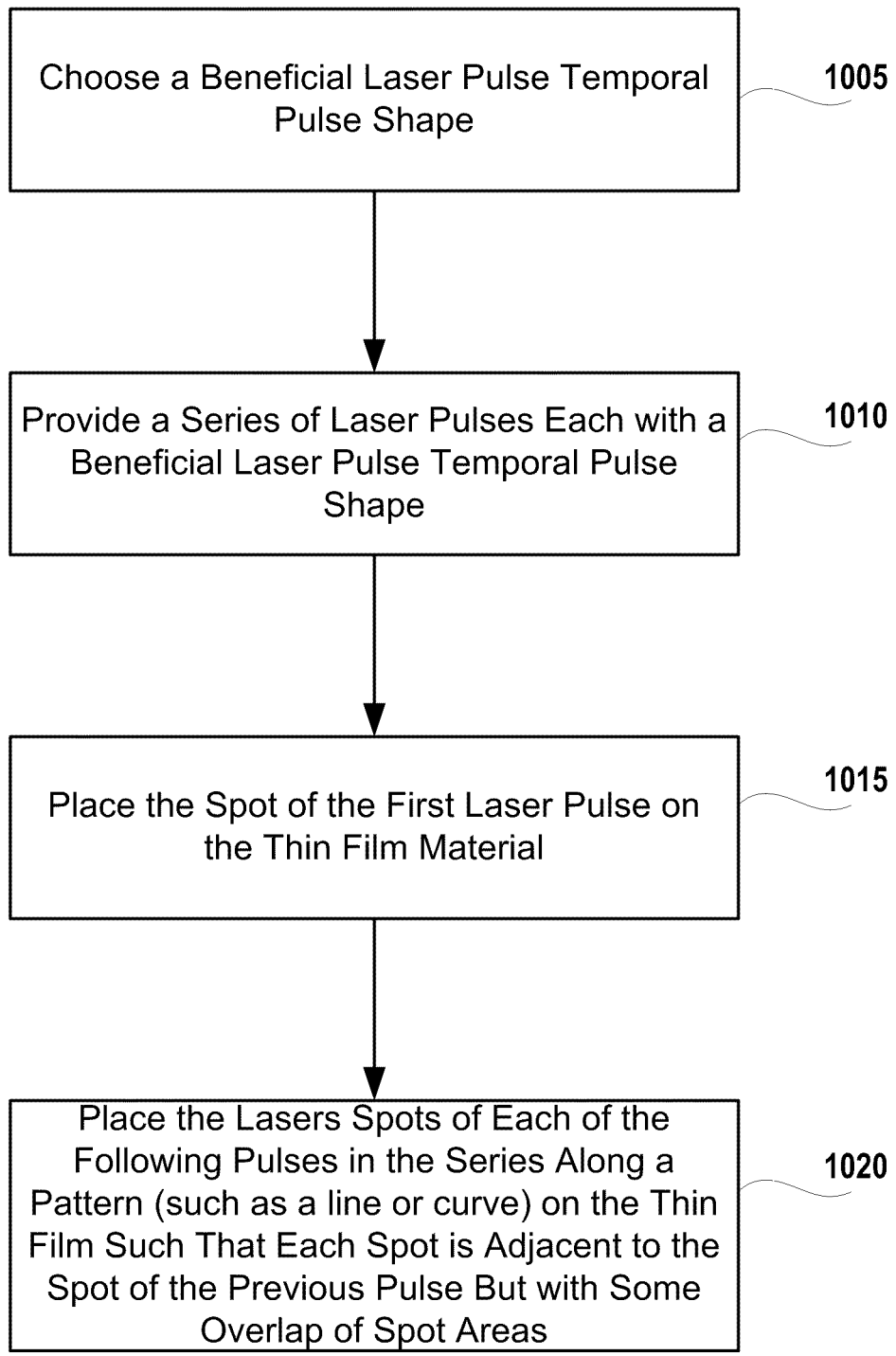
FIG. 10 is a flow chart showing a method for scribing a line in a thin film material using a burst of pulses with a beneficial pulse shape according to an embodiment of the present invention.

FIG. 10 is a flow chart showing a method for scribing a pattern in a thin film material using a burst of pulses with a beneficial pulse shape according to an embodiment of the present invention. In one embodiment the pattern can be a line and in another embodiment the pattern can be a curve. In operation 1005, a beneficial laser pulse temporal pulse shape in chosen. In operation 1010, a series of laser pulses, each having a beneficial laser pulse temporal pulse shape is provided. In operation 1015, a spot of the first laser pulse is placed on the thin film material. In operation 1020, the lasers spots of each of the following pulses are placed in a series along a pattern, which can be a line or a curve, on the thin film such that each spot is adjacent to the spot of the previous pulse but with some overlap of spot areas.

Embodiments of the present invention provide novel laser micromachining processes suitable for a variety of applications including industrial applications. As described herein, embodiments of the present invention provide laser systems that produce new combinations of pulse duration, repetition rate, and/or pulse energy without the requirement for the design of a new laser. In some conventional systems, little attention has been focused on the subtleties of the temporal distribution of energy within a single laser pulse. The fiber laser architecture described herein overcomes conventional limitations and enables a single laser platform that can address a wide range of applications with this single laser platform. As described below, embodiments of the present invention demonstrate the advantages achieved through tailoring the temporal energy distribution of each laser pulse in time as appropriate to the particular application requirement.

In some implementations, a 25 Watt, 1064 nm pulse programmable fiber laser is utilized. Unlike conventional lasers, the laser systems described herein enable variation of the pulse duration over a wide range of pulse widths. As an example, the pulse duration can be varied over a predetermined range from approximately 2 to several 100's of nanoseconds, independent of the laser repetition rate, which is also variable. As an example, the variation in the laser repetition rate can vary from single pulses up to rates of 500 kHz. In some implementations, the rate is over 500 kHz. In addition to variations in the pulse duration and repetition rate, each pulse can be arbitrarily programmed to provide a predetermined (also referred to as a beneficial) temporal profile of instantaneous laser power. Pulse trains including these shaped pulses can be applied to the micro-machining process at high repetition rates.

Embodiments of the present invention are applicable to CdTe solar cell scribing applications. As will be evident to one of skill in the art, CdTe is utilized as a material system for thin film photovoltaic (PV) modules. For laser scribing of CdTe, the P1 step typically results in exposure of the soda lime glass (SLG) substrate. In turn, Na diffusion from the glass is detrimental to the performance of the CdTe film. To mitigate this problem, conventional processes implement the P1 scribe after the CdTe deposition and the resulting groove is then backfilled with a photo-resist to serve as a Na diffusion barrier, to serve as mechanical support for the overlying conductive layers, and to prevent subsequent electrical shunting. This photo-resist application process accounts for a significant fraction of the cost for the capital equipment in a CdTe module production line.

Figure 11:
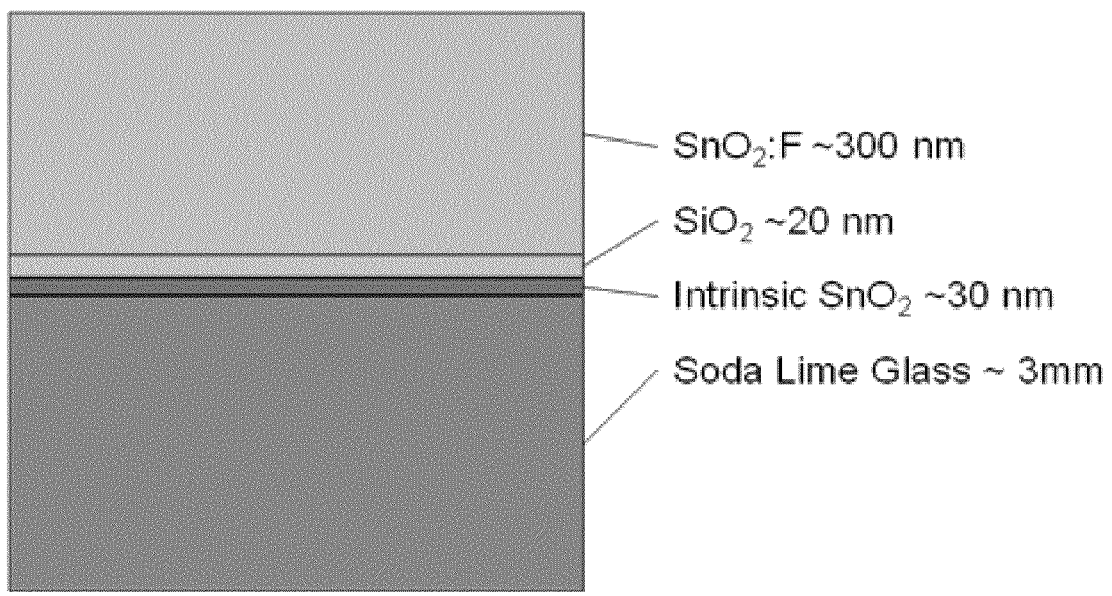
FIG. 11 is a simplified schematic diagram of a multi-layer stack thin film structure suitable for processing according to an embodiment of the present invention.

Were it not for the Na diffusion issue, the P1 scribe could be performed before the deposition of the active CdTe layer, thus eliminating the photo-resist application step. The glass substrates commonly used for CdTe solar cells are TEC series glasses that are produced commercially for the architectural industry. The distinguishing feature of these glasses is a multi-layer transparent conductive oxide coating (TCO) on one side that gives the surface high electrical conductivity. FIG. 11 is a simplified schematic diagram of a multi-layer stack thin film structure suitable for processing according to an embodiment of the present invention. The structure illustrated in FIG. 11 is a multi-layer stack for TEC15 glass although other glass substrates are suitable for use with embodiments of the present invention. The structure includes an SLG substrate about 3 mm thick, an intrinsic $SnO_2$ layer about 30 nm thick, an $SiO_2$ layer about 20 nm thick, and a $SnO_2$:F layer about 300 nm thick. The $SnO_2$:F layer provides the high electrical conductivity for the structure. Embodiments of the present invention are applicable to other thin film stack structures, for example, TEC10 glass, which has a similar structure, but including a thicker $SnO_2$:F layer.

Although FIG. 11 represents particular materials suitable for processing using embodiments of the present invention, the present invention is not limited to these particular materials. In other embodiments, the first layer illustrated as intrinsic $SnO_2$ can be one or more layers that provide a diffusion barrier to sodium or other elements present in the underlying substrate (e.g., soda lime glass). Additionally, the first layer illustrated as intrinsic $SnO_2$ can provide for adhesion promotion. The second layer illustrated as $SiO_2$ can prevent diffusion of the fluorine or other suitable dopant into the first layer or the underlying substrate. Thus, both the first and second layers can provide diffusion barrier functionality. In some embodiments, the first layer illustrated as intrinsic $SnO_2$ provides a transmission spectrum control function to color balance light transmitted through or reflected from structure. Thus, materials other than $SnO_2$ can be used in implementations that utilize color control. Moreover, the second layer, which can be insulating, provides isolation between various sections of the solar cell after the P1 scribe. $SiO_2$ is illustrated in FIG. 11, but the present invention is not limited to this particular material and other insulating layers such as other oxide-based dielectrics and nitride-based dielectrics (e.g., $Si_3N_4$) can be utilized in applications for which electrical isolation is desirable.

Conventional laser scribe based CdTe P1 processes remove all three illustrated layers, potentially exposing the CdTe film to the detrimental Na from the glass substrate. Some embodiments of the present invention remove only the $SnO_2$:F layer and terminate on the $SiO_2$ layer, thereby preserving a barrier between the glass substrate and the CdTe film. As a result, the methods described herein reduce or eliminate the Na diffusion issue discussed above.

The inventors have determined that film ablation at 1064 nm produces an interesting laser interaction phenomenon. In particular, the inventors have determined that the depth of a single pulse ablation pit is substantially only a function of pulse duration. That is, pulse energy and peak power have relatively little impact on the resulting depth of the ablation pit. Furthermore, the inventors have determined that the bottom of ablation pits can be produced that are substantially flat. Without limiting embodiments of the present invention, the inventors believe that a chemical dissociation of the $SnO_2$:F layer is occurring during ablation and, therefore, the reaction rate regulates the rapidity with which the pit depth increases. A calculation based on the enthalpy of formation for $SnO_2$ indicates that dissociation of a volume of $SnO_2$ present in a single 25 μm diameter pit uses about 4 μJ of energy in an a single pulse interaction. Considering that this calculation does not include the heat capacity, heat of fusion, and heat of vaporization, this result still compares favorably to the actual energy provided in a 15 μJ laser pulse. Furthermore the reaction is endothermic, which results in the reaction ceasing when the heat source is removed (i.e., when the laser pulse stops). In some embodiments, the reaction ceases substantially simultaneously with the removal of the heat source.

Figure 12:
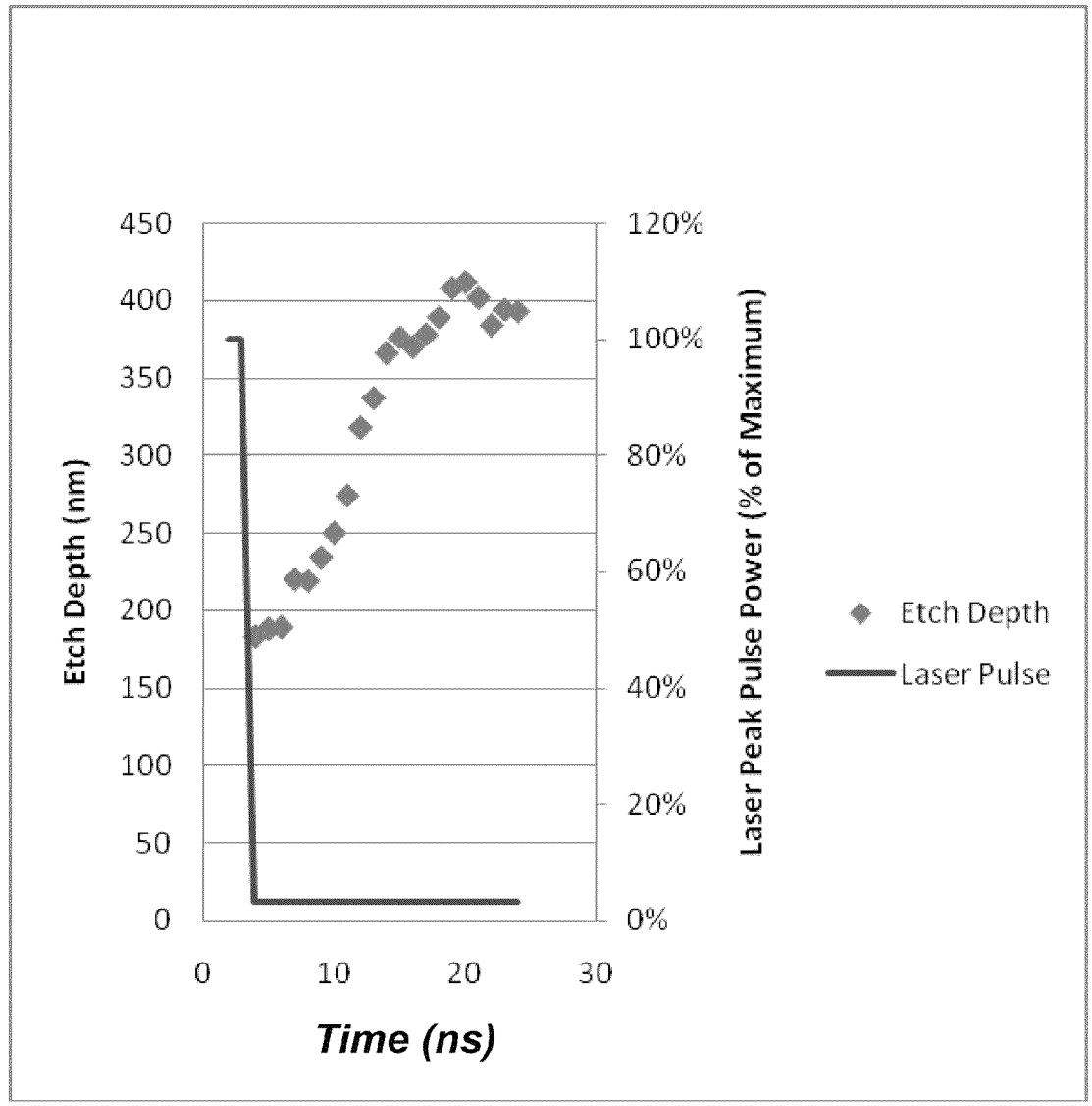
FIG. 12 is a simplified plot illustrating laser pulse shape and etch depth as a function of time according to an embodiment of the present invention.

FIG. 12 is a simplified plot illustrating laser pulse shape and etch depth as a function of time according to an embodiment of the present invention. Referring to FIG. 12, the laser pulse shape (temporal profile) is illustrated by the solid line and the etch depth is illustrated by the diamonds. The laser pulse shape can be referred to as "Chair Pulse," with the time from about 4 ns to about 25 ns representing the seat of the chair. The etch depth represents the depth of an etch pit resulting from a single pulse ablation event. The change in slope of the etch depth profile as a function of time at about 360 nm of depth corresponds to an etch rate change that occurs at the interface between the $SnO_2$:F layer and the $SiO_2$ layer. As discussed herein, the "tail duration" includes the initial high peak power spike (2 ns long in FIG. 12). Thus, the term "tail duration" includes the time from the start of the pulse to the end of the pulse. Although the laser pulse shape illustrated in FIG. 12 includes a first portion 2 ns long and a second portion 23 ns long, this is not required by the present invention. In other embodiments, the first portion ranges from about 0.1 ns to about 5 ns and the second portion ranges from about 5 ns to about 50 ns, for example about 10 ns to about 25 ns.

Embodiments of the present invention utilize control of the energy input as a function of time to provide precise control of the depth of the ablation pit while reducing or minimizing the total energy input, and therefore, the heat impact on the underlying layers. Referring to FIG. 12, the pulse tailoring discussed above is utilized to create a pulse that starts with an initially high peak power for a predetermined period of time and then reduces the power to a level sufficient to maintain the $SnO_2$:F dissociation reaction (and/or sublimation and evaporation) until the $SnO_2$:F layer is removed. As an example, the laser peak pulse power is 6 kW for the first 2 ns to initiate the dissociation reaction and then is reduced to 300 W for the subsequent 23 ns in order to maintain and complete the dissociation reaction. In other embodiments, the laser peak power during the first portion of the pulse (e.g., the first 2 ns) ranges from about 500 W to about 20 kW and the laser peak power during the second portion ranges from about 100 W to about 1 kW. In some embodiments, a single pulse process is used to remove a predetermined area of the thin film structure. In other embodiments, a single pulse burst is used in the removal process including a plurality of sub-pulses produced during a single laser firing event. In these embodiments, the single optical pulse or pulse burst removes the top layer while not removing substantial portions of the underlying layer. In order to form a linear structure, beam shaping can be used to form beams with a non-Gaussian predetermined cross section (e.g., a rectangular beam with a top hat profile or other homogenized shape). The shaped laser beam can then be sequentially directed to a series of adjacent predetermined areas that are stitched together to form a linear structure formed by the adjacent positioning of the predetermined areas (an analogy would be a series of contacting floor tiles). Rectangular beam cross sections can be utilized in these embodiments as well as other geometries.

Figure 14:
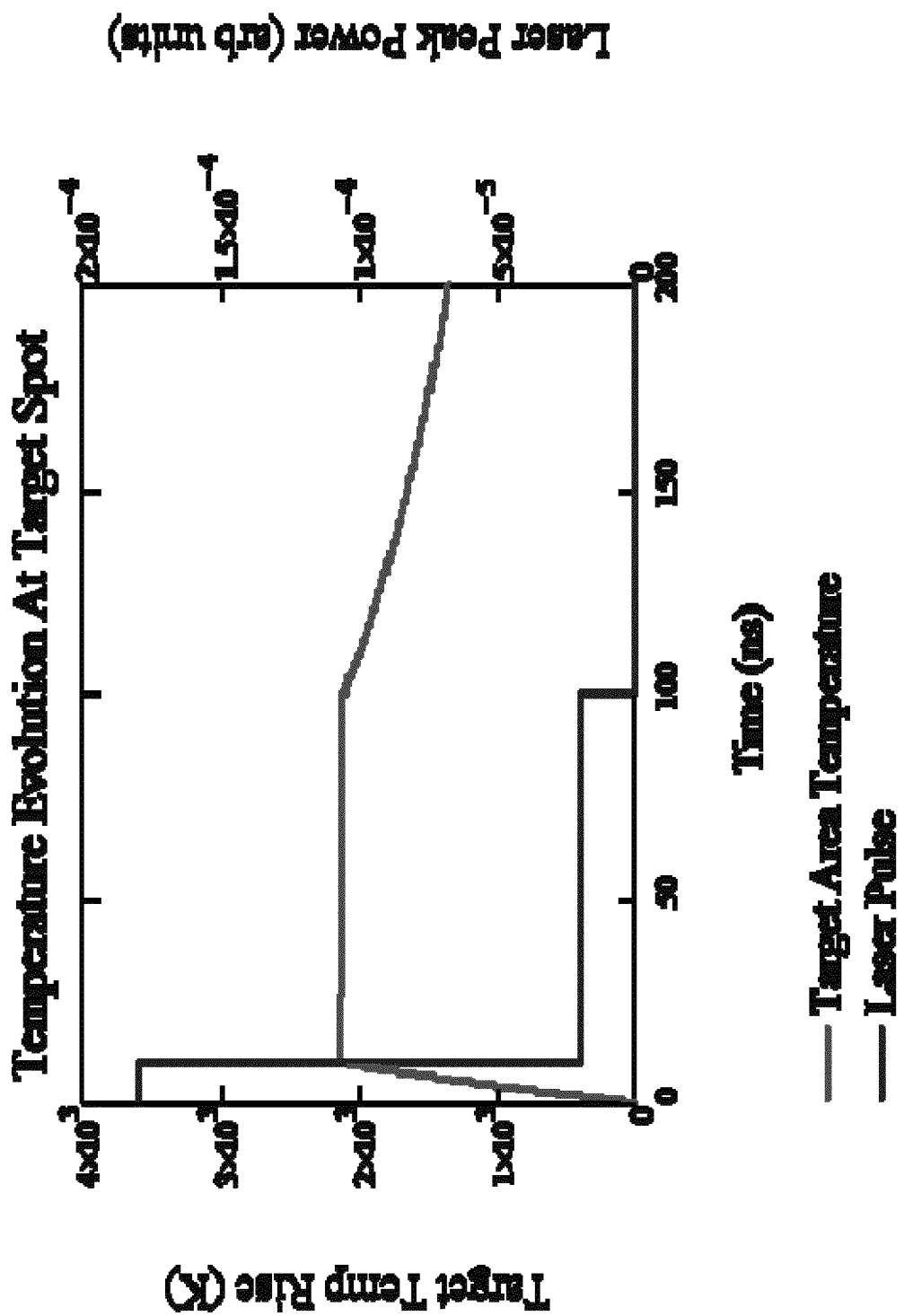
FIG. 14 illustrates a plot of target area temperature as a function of time correlated with the laser peak power in the laser pulse.

As described above, embodiments of the present invention maintain the dissolution reaction during the second portion of the pulse. The inventors believe, without limiting the scope of the present invention that maintaining the dissolution reaction results from providing a constant temperature profile as a function of time. FIG. 14 illustrates a plot of target area temperature as a function of time correlated with the laser peak power in the laser pulse. As shown in FIG. 14, the temperature of the area being removed during the second portion of the pulse is substantially constant. By tuning the temporal shape of the laser pulse, it is possible to match the energy inflow and outflow to maintain a constant temperature. In other embodiments, a range of temperatures are produced that still provide maintenance of the dissolution process. In these embodiments, the temperature may vary, for example, by about 5% or by about 10% in relation to the constant value illustrated in FIG. 14.

In some embodiments, the peak power can be reduced by more than 95% of the initial peak power while still continuing the desired reaction. The duration of the second portion is controlled to provide for controllable removal of the thin film layers to an accuracy of tens of nanometers.

Figure 13:
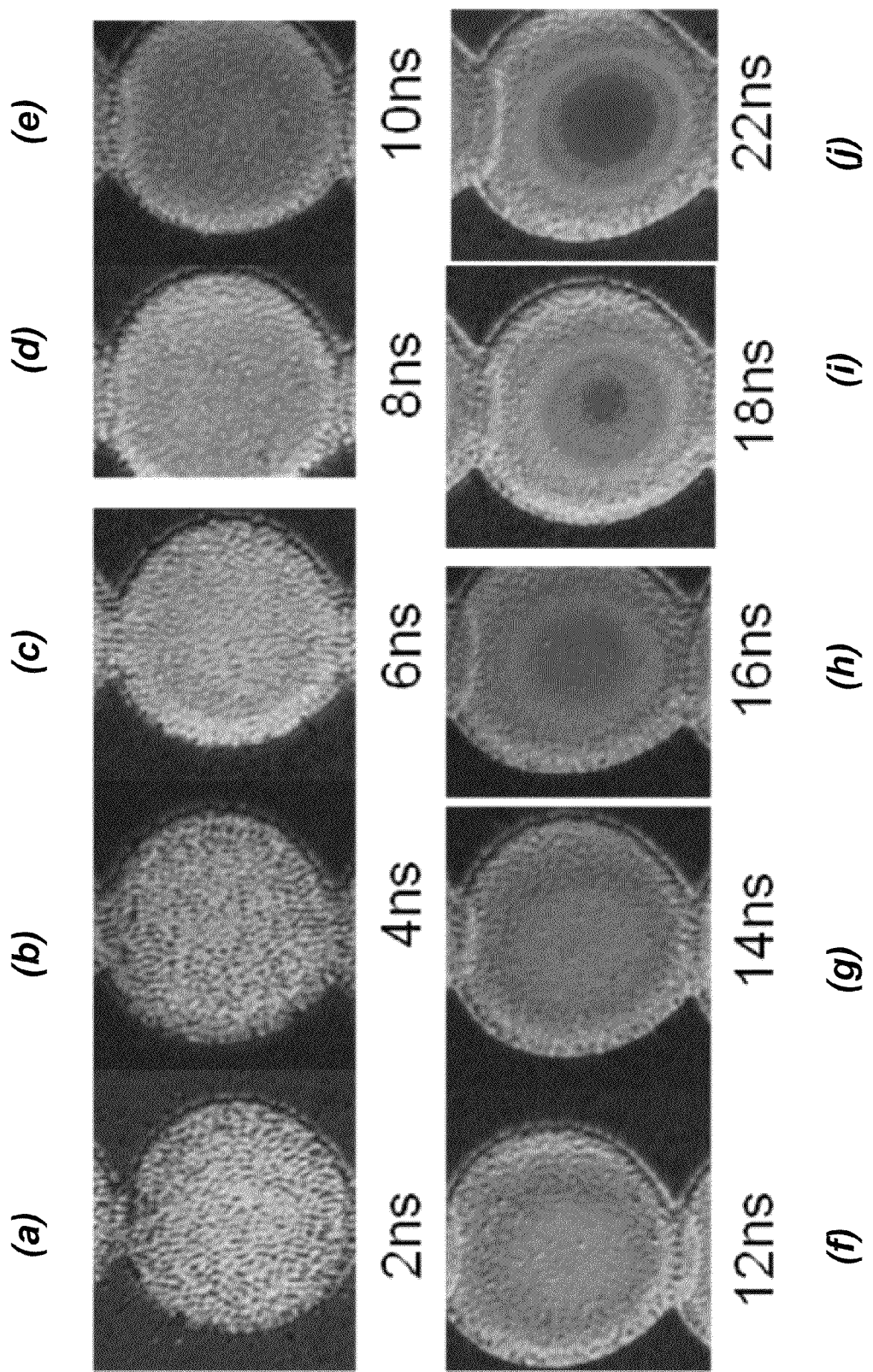
FIG. 13 is a series of optical images showing changes in etch pit morphology as a function of time according to an embodiment of the present invention.

FIG. 13 is a series of optical images showing changes in etch pit morphology as a function of time according to an embodiment of the present invention. Referring to FIG. 13, the etch pit morphology can be tracked using optical microscopy as the duration of the pulse tail is increased. The images (a) through (j) are obtained at 2 ns from the beginning of the optical pulse (i.e., the end of the first portion) (image (a)) up to 22 ns from the beginning of the pulse (image (j)), which occurs near the end of the second portion. The first few images (images (a) through (e)) illustrate initial removal of the $SnO_2$:F layer as the etch pit depth increases. At about 12 ns (image (f)), the $SnO_2$:F is substantially removed and at about 18 ns (image (i)), the remaining $SiO_2$ and $SnO_2$ layers illustrated in FIG. 11 are penetrated. The rings shown in FIG. 13 likely result from interference observed in the microscope images.

Although embodiments of the present invention have been illustrated in relation to thin film layers used in CdTe solar cell applications, the present invention is not limited to these particular layers. Other suitable structures include amorphous silicon, flexible electronic structures, flat panel displays, other structures utilizing thin films, ZnO-base films, and the like. Merely by way of example, thin film materials including layers including amorphous silicon, cadmium telluride, copper indium diselenide, copper indium gallium diselenide, zinc oxide, and molybdenum are included within the scope of the present invention. One of ordinary skill in the art would recognize many variations, modifications, and alternatives.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A method of removing at least a portion of a thin film structure, the thin film structure including at least a first layer and a second layer in contact with the first layer, the method comprising:
   providing a laser pulse characterized by a temporal pulse shape having a first peak power level during a first portion and a subsequent second peak power level during a second portion;
   directing the laser pulse to impinge on the thin film structure;
   initiating a removal process in the first layer by initiating a dissociation reaction in the first layer during the first portion;
   maintaining the dissociation reaction in the first layer during the second portion; and
   terminating the removal process at the end of the second portion.

2. The method of claim 1 wherein a fall time between the first portion and the second portion is less than 5% of a duration of the temporal pulse shape.

3. The method of claim 2 wherein the fall time is less than 2%.

4. The method of claim 1 wherein the thin film structure comprises a conductive film overlying an insulating film.

5. The method of claim 4 wherein the insulating film comprises at least one of an oxide-based or nitride-based dielectric.

6. The method of claim 5 wherein the oxide or nitride based dielectric comprises $SiO_2$.

7. The method of claim 4 wherein the conductive film comprises a transparent conductive oxide.

8. The method of claim 7 wherein the transparent conductive oxide comprises $SnO_2$:F.

9. A method of removing at least a portion of a thin film structure, the thin film structure including at least a first layer and a second layer in contact with the first layer, the method comprising:
   providing a laser pulse, with an infrared wavelength, characterized by a temporal pulse shape having a first peak power level during a first portion and a subsequent second peak power level during a second portion;
   directing the laser pulse to impinge on the thin film structure;
   initiating a removal process in the first layer by initiating a dissociation reaction in the first layer during the first portion;
   maintaining the dissociation reaction in the first layer during the second portion; and
   terminating the removal process at the end of the second portion;
   wherein the peak power in the first portion is at least twice the peak power in the second portion.

10. The method of claim 9 wherein the peak power in the first portion is at least twenty times the peak power in the second portion.

11. A method of removing at least a portion of a thin film structure, the thin film structure including at least a first layer and a second layer in contact with the first layer, the method comprising:

providing a laser pulse, with an infrared wavelength, characterized by a temporal pulse shape having a first peak power level during a first portion and a subsequent second peak power level during a second portion;

directing the laser pulse to impinge on the thin film structure;

initiating a removal process in the first layer by initiating a dissociation reaction in the first layer during the first portion;

maintaining the dissociation reaction in the first layer during the second portion; and terminating the removal process at the end of the second portion;

wherein maintaining the dissociation reaction during the second portion comprises maintaining a temperature of the first layer at a substantially constant temperature during the second portion.

12. A method of laser scribing a CdTe solar cell structure, the method comprising:

providing a laser operable to produce an optical pulse, with an infrared wavelength, being characterized by a temporal profile having a first power level during a first portion of the optical pulse and a second power level less than the first power level during a second portion of the optical pulse;

directing the optical pulse to impinge on the CdTe solar cell structure, wherein the CdTe solar cell structure comprises a substrate, a conductive layer, and a barrier layer between the conductive layer and substrate;

initiating a removal process for the conductive layer by initiating a dissociation reaction;

and terminating the removal process prior to removing the barrier layer.

13. The method of claim 12 wherein the temporal profile comprises a pulse length between about 1 ns and 600 ns.

14. The method of claim 12 wherein the substrate comprises soda lime glass.

15. The method of claim 12 including an additional layer between the barrier layer and the substrate, the additional layer comprising at least one of $SnO_2$ and another material to color balance light transmitted through or reflected from structure.

16. The method of claim 12 wherein the barrier layer comprises at least one of $SiO_2$ or $Si_3N_4$.

17. The method of claim 12 wherein initiating the removal process for the conductive layer comprises maintaining a temperature of the conductive layer at a constant temperature during the second portion.

18. The method of claim 12 wherein the optical pulse is characterized by a non-Gaussian, shaped spatial profile.

19. The method of claim 12 wherein the conductive layer comprises a transparent conductive oxide.

20. The method of claim 19 wherein the conductive oxide comprises at least one of $SnO_2{:}F$, $In_2O_3$, $ZnO$, or $CdSnO_x$.

* * * * *